(12) United States Patent
Fiedler et al.

(10) Patent No.: US 11,023,105 B2
(45) Date of Patent: Jun. 1, 2021

(54) SYSTEMS AND METHODS FOR COMPOSABLE ANALYTICS

(71) Applicant: Massachusetts Institute of Technology, Cambridge, MA (US)

(72) Inventors: Lars Henry Fiedler, Lexington, MA (US); Timothy Dasey, Needham, MA (US); Micah Thomas Lee, Medford, MA (US); Heather Lynn Griffin, Acton, MA (US); Ronald Taylor Locke, Arlington, MA (US); Kevin Kyung Nam, Burlington, MA (US); Rajendra F. Laad, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 526 days.

(21) Appl. No.: 14/505,262

(22) Filed: Oct. 2, 2014

(65) Prior Publication Data
US 2015/0095841 A1    Apr. 2, 2015

Related U.S. Application Data

(60) Provisional application No. 61/886,020, filed on Oct. 2, 2013.

(51) Int. Cl.
*G06F 16/242* (2019.01)
*G06F 3/0484* (2013.01)
*G06F 16/2458* (2019.01)

(52) U.S. Cl.
CPC ........ *G06F 3/0484* (2013.01); *G06F 16/2423* (2019.01); *G06F 16/2465* (2019.01)

(58) Field of Classification Search
CPC ............ G06F 3/0484; G06F 17/30392; G06F 16/2465; G06F 16/2423
See application file for complete search history.

(56) References Cited

U.S. PATENT DOCUMENTS 7,451,403 B1 * 11/2008 Srinivasan ................ G06F 8/10
715/762
8,321,792 B1   11/2012 Alur et al.
(Continued)

FOREIGN PATENT DOCUMENTS

| CN | 101370121 A | 2/2009 |
| GB | 2456622 A | 7/2009 |

(Continued)

OTHER PUBLICATIONS

A. Maiti, A. Dasgupta, N. Zhang, "HDSampler: Revealing Data Behind Web Form Interface," International Conference on Management of Data, 2009.
(Continued)

*Primary Examiner* — Beau D Spratt
(74) *Attorney, Agent, or Firm* — McCarter & English, LLP

(57) ABSTRACT

Systems, methods, and computer readable medium are provided for a composable analytics environment. A graphical module repository is provided that consists of a plurality of graphical modules that are configured to perform a data processing function. An input is received from a user indicating a selection of at least one graphical module from the graphical module repository to be part of an application. A data set to be analyzed by the application is received. The application designed by the user is executed.

23 Claims, 19 Drawing Sheets

(56) References Cited

U.S. PATENT DOCUMENTS

| | | | | |
|---|---|---|---|---|
| 2006/0129683 | A1* | 6/2006 | Hansen | G06F 9/465 |
| | | | | 709/229 |
| 2007/0130541 | A1* | 6/2007 | Louch | G06F 3/04817 |
| | | | | 715/804 |
| 2008/0184140 | A1* | 7/2008 | Koerner | G06F 8/34 |
| | | | | 715/762 |
| 2008/0295164 | A1 | 11/2008 | Steiner et al. | |
| 2010/0083222 | A1* | 4/2010 | Maximilien | G06F 8/20 |
| | | | | 717/110 |
| 2010/0114844 | A1* | 5/2010 | Xiong | G06F 17/30893 |
| | | | | 707/693 |
| 2010/0250625 | A1* | 9/2010 | Olenick | G06F 17/30607 |
| | | | | 707/810 |
| 2011/0138283 | A1 | 6/2011 | Marston | |
| 2012/0124104 | A1* | 5/2012 | Bhandari | G06Q 10/067 |
| | | | | 707/812 |
| 2012/0330970 | A1 | 12/2012 | Bieren et al. | |
| 2013/0073473 | A1 | 3/2013 | Heath | |
| 2014/0164359 | A1* | 6/2014 | Jeffery | G06F 16/338 |
| | | | | 707/722 |

FOREIGN PATENT DOCUMENTS

| | | |
|---|---|---|
| JP | 2008269330 A | 11/2008 |
| JP | 2011070644 A | 4/2011 |

OTHER PUBLICATIONS

A. Ngu, M. Carlson, Q. Sheng, "Semantic-Based Mashup of Composite Applications," IEEE Transactions on Services Computing, vol. 3, No. 1, 2010.

A. Riabov, E. Bouillet, M. Feblowitz, Z. Liu, A. Ranganathan, "Wishful Search: Interactive Composition of Data Mashups," 17th International Conference on World Wide Web, 2008.

C. Cappiello, M. Matera, M. Picozzi, A. Caio, M. Guevara, "MobiMash: End User Development for Mobile Mashups," 21st Annual Conference on World Wide Web, 2012.

C. Li, "Enterprise Information Mashup and Real Time Business Assurance for Global Collaboration," International Conference on Collaborative Computing: Networking, Applications and Worksharing, 2006.

C. Wijesiriwardana, G. Ghezzi, H. Gall, "A Guided Mashup Framework for Rapid Software Analysis Services Composition," 2012 19th Asia-Pacific Software Engineering Conference, 2012.

E. Lee, H. Joo, K. Seo, "Deterministic Data Binding for Dynamic Service Compositions," International Workshop on Convergence Security in Pervasive Environments, 2011.

E. Rahm, A. Thor, D. Aumueller, "Dynamic Fusion of Web Data," Database and XML Technologies pp. 14-16, 5th International XML Database Symposium, 2007.

F. Daniel, C. Rodriguez, S. Chowdhury, H. Nezhad, F. Casati, "Discovery and Reuse of Composition Knowledge for Assisted Mashup Development," 21st Annual Conference on World Wide Web, 2012.

G. Cardona, M. Garijo, "A Conceptual Architecture for Semantic Mash up Recommender Framework," Eight International Conference on Signal Image Technology and Internet Based Systems, 2012.

G. Di Lorenzo, H. Hacid, H. Paik, "Data Integration in Mashups," SIGMOD Record, vol. 38, No. 1, pp. 59-66, 2009.

G. Tekli, R. Chbeir, J. Fayolle, "XCDL: an XML-Oriented Visual Composition Definition Language," 12th International Conference on Information Integration and Web-Based Applications and Services (iiWAS), 2010.

G. Tummarello, R. Cyganiak, M. Catasta, S. Danielczyk, "Sig.ma: Live Views on the Web of Data," 11th IFIP WG 5.5 Working Conference on Virtual Enterprises, 2010.

J. Huang, X. Liu, Q. Zhao, J. Ma, G. Huang, "A Browser-based Framework for Data Cache in Web-Delivered Service Composition," IEEE International Conference on Service-Oriented Computing and Applications (SOCA), 2010.

J.E. Heier, "Mashup the OODA Loop," MITRE Technical Report, Jun. 2008.

K. Wang, X. Bai, J. Li, C. Ding, "A Service-Based Framework for Pharmacogenomics Data Integration," IEEE International Conference on e-Business Engineering, 2009.

L. Xu, P. Vrieze, K. Phalp, S. Jeary, P. Liang, "Lightweight Process Modeling for Virtual Enterprise Process Collaboration," 11th IFIP WG 5.5 Working Conference on Virtual Enterprises, 2010.

M. Jarrar, M. Dikaiakos, "A Query Formulation Language for the Data Web," IEEE Transactions on Knowledge and Data Engineering, vol. 24, No. 5, pp. 783-798, May 2012.

M. Tritschler, R. Kleinfeld, S. Steglich, "Enhancing Interoperability in Cross-Platform Enterprise Mashups through Data Aggregation and Extraction," IEEE International Conference on High Performance Computing and Communications (HPCC), 2011.

O. Hassan, L. Ramaswamy, J. Miller, "MACE: A Dynamic Caching Framework for Mashups," IEEE International Conference on Web Services, 2009.

P. Gao, H. Han, "From Toys to Products: A Step Towards Supporting the Robust Reuse and Integration on the Web," 6th International Conference on Ubiquitous Information Management and Communication (ICUIMC), 2012.

P. Grobelny, A. Pieczynski, "Results of Research on Method for Intelligent Composing Thematic Maps in the Field of Web GIS," Third International Conference, Computational Collective Intelligence (ICCCI), 2011.

P. Lachenmaier, F. Ott, A. Immerz, A. Richter, "CommunityMashup—A Flexible Social Mashup based on a Model-Driven-Approach," IEEE International Conference on Information Reuse & Integration (IRI), 2011.

S. Chowdhury, "Assisting End-User Development in Browser-Based Mashup Tools," International Conference on Software Engineering (ICSE), 2012.

S. Pietschmann, M. Voigt, K. Meibner, "Rich Communication Patterns for Mashups," 12th International Conference on Web Engineering (ICWE), 2012.

S. Zhiyuan, V. Gruhn, Z. Mingfang, "Optimization of Semantic Mashup Architecture Applied in Microlearning Environment," IEEE Transactions on Services Computing, vol. 3, No. 1, pp. 2-15, 2010.

T. Fischer, F. Bakalov, A. Nauerz, "Towards an Automatic Service Composition for Generation of User-Sensitive Mashups," 16th Workshop on Adaptivity and User Modeling in Interactive Systems (ABIS), 2008.

W. Hummer, P. Leitner, S. Dustdar, "WS-Aggregation: Distributed Aggregation of Web Services Data," 26th Annual ACM Symposium on Applied Computing, 2011.

W. Yang, J. Li, K. Wang, "Tranforming Heterogeneous Messages Automatically in Web Service Composition," Frontiers of WWW Research and Development, 8th Asia-Pacific Web Conference, 2008.

X. Liu, Q. Zhao, G. Huang, H. Mei, T. Teng, "Composing Data-Driven Service Mashups with Tag-based Semantic Annotations," IEEE International Conference on Web Services, 2011.

Y. Dittrich, P. Madsen, R. Rasmussen, "Really Simple Mash-Ups," End-User Development, Proceedings Third International Symposium, 2011.

Y. Kang, "Data Aggregation Scheme for a Mashup based Internet Application," Eighth International Conference on Information Technology: New Generations, 2011.

Y. Lee, J. Kim, "Automatic Web API Composition for Semantic Data Mashups," 2012 Fourth International Conference on Computional Intelligence and Communication Networks, 2012.

Y. Lee, J. Kim, "Semantically Enablded Data Mashups using Ontology Learning Method for Wed APIs," Computing, Communications and Applications Conference (ComComAp), 2012.

Y. Liu, E. Haihong, L. Ma, "Design and Implementation of an Open Platform for Services Integration based on Mashup," 13th International Conference on Enterprise Information Systems (SSE), 2011.

(56) References Cited

OTHER PUBLICATIONS

Z. Pan, H. Tang, M. Ge, C. Zhang, "A Framework of Spreadsheet-based Web Mashup," International Conference on Computer Science and Service System (CSSS), 2011 (with English Abstract).

* cited by examiner

```
[ModuleType(Name = "Calculator", Namespace = "edu.mit.ll.companalytics", Category =
ModuleCategory.Operator, Icon = "./images/module-icons/calculator.png")]
[Description("Performs numerical operation on two numbers")]
public class CalculatorModuleExecutor : ModuleExecutor
{
    [Description("First numerical input")]
    public ModuleInput<double> Param1 { get; set; }

[ComboBoxControl("*", "+", "-", "/", "%", "^")]
    [Description("Numerical operation")]
    public ModuleInput<string> Operator { get; set; }

[Description("Second numerical input")]
    public ModuleInput<double> Param2 { get; set; }

[Description("Output of operation")]
    public ModuleOutput<double> Result { get; set; } public override Module GetDefaultModule()
    {
        Module module = base.GetDefaultModule();
        module.ModuleInputs.First(m => m.Name == "Param1").ValueObj = (double)1;
        module.ModuleInputs.First(m => m.Name == "Operator").ValueObj = "+";
        module.ModuleInputs.First(m => m.Name == "Param2").ValueObj = (double)2;
        return module;
    } public override void Execute(ExecutionContext context)
    {
        double param1 = this.Param1.Get(context);
        string op = this.Operator.Get(context);
        double param2 = this.Param2.Get(context);

double result = this.Operate(param1, param2, op);
        this.Result.Set(context, result);
    } double Operate(double val1, double val2, string op)
    {
        switch (op)
        {
            case "*":
                return val1 * val2;
            case "+":
                return val1 + val2;
            case "-":
                return val1 - val2;
            case "/":
                return val1 / val2;
            case "%":
                return val1 % val2;
            case "^":
                return (double)((int)val1 ^ (int)val2);
            default:
                throw new NotSupportedException(String.Format("Operator {0} is not supported", op));
        }...
```

| Principal | | Permissions | | | | | | | |
|---|---|---|---|---|---|---|---|---|---|
| Name | Type | Read | Read-Private | Write | Execute | Clone | Discover | Delete | Remove |
| Everyone | Role | ☑ | ☐ | ☐ | ☐ | ☑ | ☑ | ☐ | ✖ |
| lars | User | ☑ | ☑ | ☑ | ☑ | ☑ | ☑ | ☑ | ✖ |
| City Public Health | Group | ☑ | ☑ | ☐ | ☑ | ☑ | ☑ | ☐ | ✖ |

Resource Identifier: 3185
Owner: lars

Add Principals
Add User:
Add Group: City Public Health
Add Everyone   Add Authenticated Save

SYSTEMS AND METHODS FOR COMPOSABLE ANALYTICS

RELATED APPLICATIONS

This application relates to and claims priority from U.S. Provisional Patent Application No. 61/886,020 filed on Oct. 2, 2013, the entire disclosure of which is incorporated herein by reference in its entirety.

TECHNICAL FIELD

Systems, methods, and computer-readable medium relating to application development for analytic purposes are provided.

BACKGROUND

Users are gathering more data than ever before, and they have to a considerable number of disparate data sets. Most users are not examining the same data every day, nor are they using the same methods over and over again. The workloads are variable, and require adaptability over short periods of time. Users need a flexible environment to investigate the data and easily try new analysis techniques.

Typically a team of developers work to create a system to process and analyze large data sets. Each time the data and/or analytical method is updated or changed, a developer is needed to re-program the system. This approach is inefficient in terms of time and cost. Opportunities are lost when developers cannot develop a system quickly enough to meet an event-driven need, or when the cost of developing custom software is prohibitive. Instead of the power for adaptability remaining solely in the control of software developers, that power also needs to be in the hands of the users themselves.

SUMMARY

Exemplary embodiments of the present disclosure are directed to a composable analytics environment for a user to create an application for data analysis.

In one embodiment, a method for a user to create an application for data analysis in a composable analytics environment is provided. The method includes providing a graphical module repository consisting of a plurality of graphical modules, wherein each graphical module of the plurality of graphical modules is configured to perform a data processing function, receiving input from a user, via a user interface, indicating selection of at least one graphical module from the graphical module repository to be part of an application, receiving a data set to be analyzed by the application, executing the application designed by the user, and publishing a result of the application and the application in the composable analytics environment, the published result and application accessible by other users having access to the composable analytics environment.

The application is published and accessible by other users for reuse. The graphical module repository is searchable by the user. The composable analytics environment is searchable for other applications by the user based on access permissions associated with the other applications. The method further includes rendering the user interface and receiving the input from the user via the user interface. The method further includes adding an additional graphical module to the graphical module repository, the additional graphical module created by the user. The at least one graphical module includes an input and an output. The method further includes receiving input from the user, via the user interface, indicating a selection of an additional graphical module from the graphical module repository to be part of the application, and receiving input from the user, via the user interface, graphically connecting an output of the at least one graphical module to an input of the additional graphical module.

In another embodiment, a system for a user to create an application for data analysis in a composable analytics environment is provided. The system includes a graphical module repository stored on a database consisting of a plurality of graphical modules, each graphical module of the plurality of graphical modules configured to perform a data processing function, a processor-implemented application designer configured to receive input from a user indicating selection of at least one graphical module from the graphical module repository to be part of an application, and receive a data set to be analyzed by the application, an application executor configured to execute the application designed by the user, and a publication module configured to publish a result of the application and the application in the composable analytics environment, the published result and published application accessible to other users having access to the composable analytics environment.

In the system, the application is reusable by other users, and the at least one graphical module includes an input and an output. The application designer is configured to render a user interface and receive input from the user via the user interface. The graphical module repository is searchable by the user. The composable analytics environment is searchable for other applications by the user. The composable analytics environment is searchable for other applications based on access permissions associated with the other applications. The application designer is further configured to receive input from the user, via a user interface, indicating a selection of an additional graphical module from the graphical module repository to be part of the application, and receive input from the user, via the user interface, graphically connecting an output of the at least one graphical module to an input of the additional graphical module.

In another embodiment, a non-transitory computer readable medium storing instructions executable by a processing device is provided, where execution of the instructions causes the processing device to implement a method in a composable analytics environment for a user to create an application for data analysis. The instructions include providing a graphical module repository consisting of a plurality of graphical modules, where each graphical module of the plurality of graphical modules is configured to perform a data processing function, receiving input from a user, via a user interface, indicating selection of at least one graphical module from the graphical module repository to be part of an application, receiving a data set to be analyzed by the application, executing the application designed by the user.

The instructions further includes receiving input from the user, via the user interface, indicating a selection of an additional graphical module from the graphical module repository to be part of the application, and receiving input from the user, via the user interface, graphically connecting an output of the at least one graphical module to an input of the additional graphical module. The instructions further include publishing a result of the application and the application in the composable analytics environment, the published result and application accessible by other users having access to the composable analytics environment.

BRIEF DESCRIPTION OF DRAWINGS

Some embodiments are illustrated by way of example in the accompanying drawings and should not be considered as a limitation of the invention:

FIG. 5 is an example software code for an application built in a composable analytics environment, according to an example embodiment;

FIG. 9 is an example user interface illustrating an access control list for an application in a composable analytics environment, according an example embodiment;

DETAILED DESCRIPTION OF EXEMPLARY EMBODIMENTS

Figure 1:
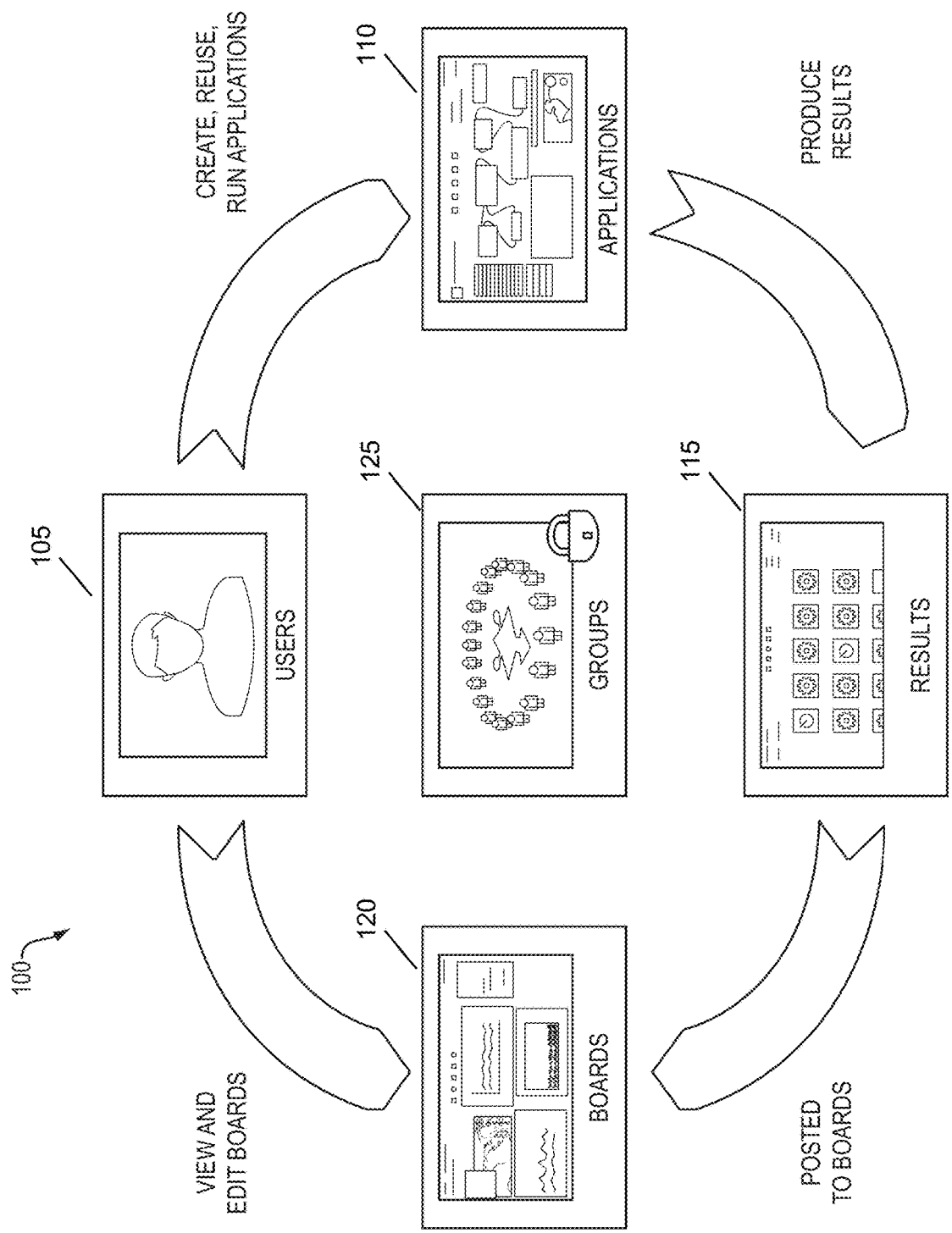
FIG. 1 is an example diagram illustrating a composable analytics environment, according to an example embodiment.

Systems, methods and computer-readable medium for a composable analytics environment are provided. The environment includes graphical modules representing software functions and computations that can be performed by a computation/processing device that can be used throughout the environment to develop applications that can be used to perform analytics on data from various data sources. The graphical modules provide a form of visual (user interface based) programming for application design and development. The composable analytics environment can be a web-based software platform that enables a community of researchers, analysts, and decision makers, who are often not software developers or software programming savvy, to collaboratively explore complex, information-based problems through the creation and use of customized analysis applications.

In general, analysts are gathering more data than ever before, and analysts have access to a considerable number of disparate data sets. There are many questions surrounding the nature of integrating and analyzing the data, and users need a flexible environment to investigate data, and to easily explore new analytical techniques. Furthermore, most analysts are not examining the same data every day, nor are they using the same methods over and over again; their workloads are variable, and require adaptability over short periods of time.

The composable analytics environment can provide an agile environment to discover and develop solutions for various data. Furthermore, the data can remain stored where it is. It does not need to be uploaded into the composable analytics environment. Users of the system can find applications that others have created and run them to produce results. If a user cannot find an application that meets their needs, they can modify an existing application, combine multiple applications together, or develop a new application from scratch. As applications produce results, users can organize and share these results through a concept called 'boards.' Boards allow users to display application results, query results, or other resources in the system. Users annotate boards with additional notes to provide context to other users.

The application designer of the composable analytics environment allows users to develop and manipulate applications. An application within the composable analytics environment consists of functional blocks strung together with connections to create new functionality. These functional blocks may be referred to as a graphical module of a function (graphical module). A graphical module can be built into the composable analytics environment by software developers, and are available at any time to all users. An application is a composition of graphical modules and/or other applications, and is constructed by an end-user and not necessarily available to all users in the environment, based on the access restrictions an end-user applies to the application.

The graphical module of a function can have multiple inputs and outputs. A graphical module may describe computations that can be performed on computational hardware, such as a computer, microcontroller, FPGA, and custom hardware. A graphical module may be analogous to a function in any programming language. The graphical module of a function receives zero or many inputs, processes the inputs, and produces zero or many outputs. These output or output nodes can then be connected to any number of other graphical module inputs. A single output node can be connected to multiple input nodes. In addition, an input node can receive zero or 1 input connections, and an input node configured as a collection can receive many input connections from output nodes. Each input and output on a graphical module has a name, data type and additional metadata fields. Inputs and outputs are strongly typed and the .NET framework type system is leveraged. A graphical module that does not have any input nodes may be configured to process data stored at a specified memory location or generate data. A graphical module that does not have any output nodes may be configured to update a database, but not produce any result to the user.

An object is a term commonly used in object-oriented programming to refer to instances of data that can be used to interact with one another to design applications or computer programs. Additionally, a data type is associated with an object, where the data type describes the type of data that the object refers to. Objects of the same types can be assigned, and objects having types that extend base types can be assigned to inputs of the base types. For example, outputs of types 'integer' can be fed into a graphical module input of type 'object.' While the application designer allows for users to combine graphical modules and other applications in any manner desired, they are restricted to the palette of graphical modules and applications in the composable analytics environment. Advanced users can design and register new graphical modules into the environment. Base graphical modules can refer to a set of graphical modules that are included in the composable analytics environment as a starting palette for the user. The user can select any of the base graphical modules to start creating applications. The base graphical modules may be provided to a user as part of a graphical module repository stored on a database. There are four extension points for adding new base graphical modules.

Graphical Module Type—This consists of the actual function that is to be executed. It defines the inputs (zero or many), outputs (zero or many), function, and any associated metadata.

Input Control—Each graphical module inputs' values can be set through a connection, or by the user through the input control. When defining the graphical module type, a user can specify which input control they want used for the input. The input control consists of a .Net attribute class, and JavaScript code which renders the control and retrieves the value from the user.

Output View—Different graphical module outputs may want to be viewed differently. For example, a string may be viewed in a text box, while rows of integers may be viewed in a tabular form. A function to render the outputs as desired can be written in JavaScript and registered for a given output type.

Input and Output Types—The data flowing from a graphical module output to another graphical module input is typed, and graphical module inputs and outputs expect data in a certain type. New types can be added to the system by simply creating a new class and referencing it when defining the graphical module type. In exemplary embodiments, objects flowing out of a module can be automatically converted to another module's input type if the output type is considered to be convertible to the input type or a casting operator has been registered in one of the types.

There are five resources within the composable analytics environment: users, groups, applications, boards, and results (also known as runs). In some embodiments, all resources are considered securable resources and have various access control permissions which can be applied to the individual resources. As users begin to explore and use the system, groups may form around common interests and social structures. Groups can also serve as a way of managing permissions for a large number of users. Users are at the root of the system, and the composable analytics environment may be seeded initially by a small number of users creating applications. As results are formed, and boards are created, users can review content and modify it. Seedling applications can begin to be cloned, modified, and run with new datasets.

FIG. 1 is an example diagram 100 illustrating the system resources and their relationships, according to an example embodiment. Diagram 100 includes users 105, applications 110, results 115, boards 120, and groups 125. Users 105 can create, reuse, and run an application 110. Applications 110 produce results 115, and the results 115 can be posted to boards 120, or sent to another system or user. Users 110 can view and edit boards 120. Groups 125 can be used to manage permissions and access to applications, results, users, groups, and/or boards.

The composable analytics environment can be a data integration platform. Data exists everywhere in different formats, and analysts have access to tremendous amounts of it. However, most data is isolated and stored in individual systems, and these systems often have different tools for viewing the data. When needs arise for cross-cutting analysis or for analysis methods not supplied by the individual systems, the data is often downloaded and analyzed offline in tools such as Matlab, R, or Excel. Cross-cutting analysis may arise when a user has to use multiple different systems to achieve a desired analysis. In that case, a user may input data into one system, take the output of that system and input that output into a different system, and so forth. This requires many steps and access to many different systems, and also takes up a considerable amount of time. Furthermore, if software development is required to integrate the data sets, then often the analysis is not performed because the software is not developed quickly enough. Often the user creates a new data analysis strategy and a large development effort is started, resulting in lag time and substantial costs.

In an example embodiment, the composable analytics environment allows users to query many information sources in a variety of formats and integrate them using a flow-based application. A flow-based application may be an application that is designed as a step-by-step process. Processing of some steps of the flow-based application may occur in parallel also. Entire datasets do not need to be uploaded, but rather only aggregated or selected data is transferred. Processes and queries can be sent to other data systems, rather than the data being sent to the composable analytics environment. Existing analysis code can also be reused and integrated—whether it's written in Matlab, Excel, or other languages. The composable analytics environment separates the method from the data, allowing users to share and reuse applications with their own datasets. The composable analytics environment also displays, via a user interface, applications and data in a cohesive manner.

Figure 2:
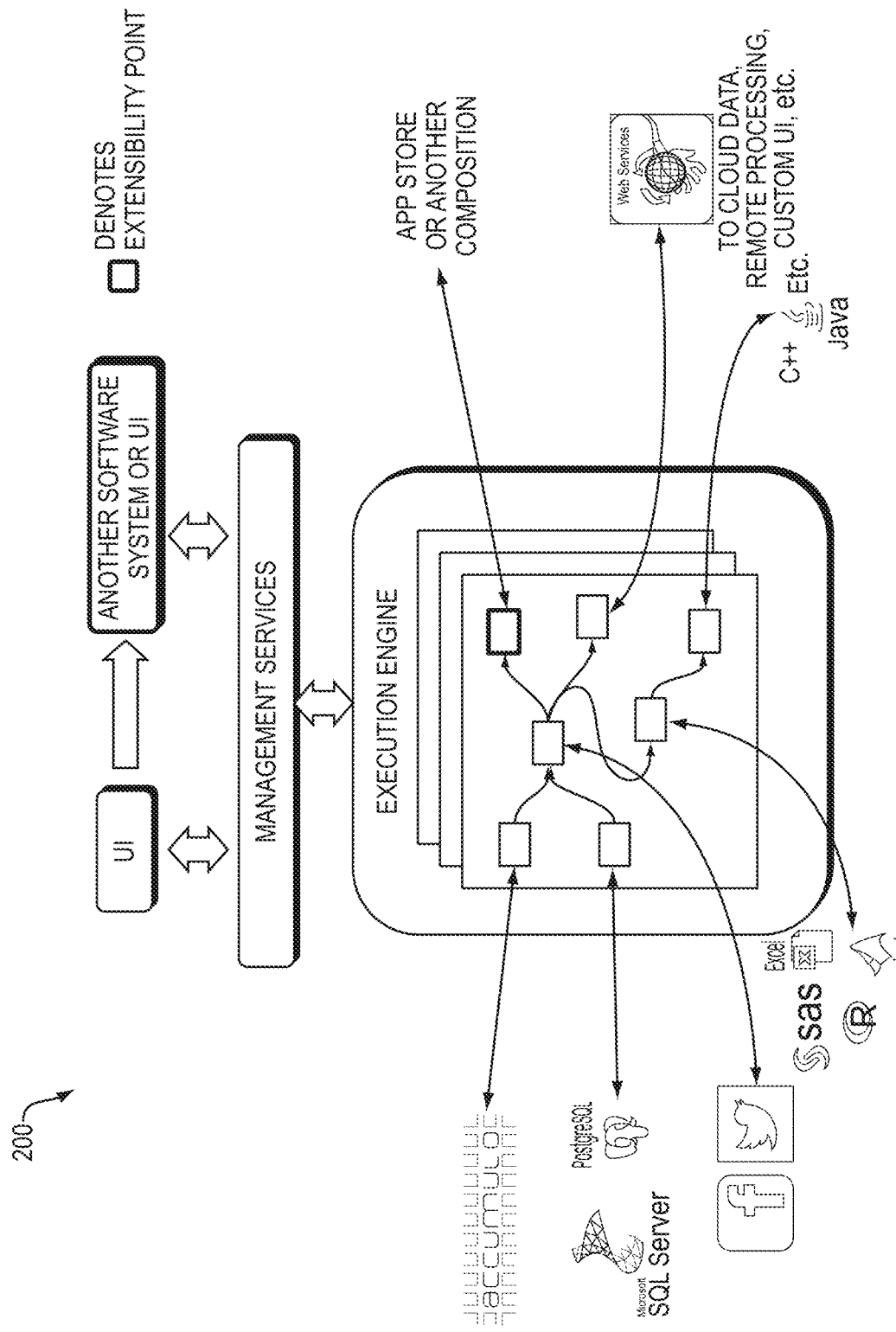
FIG. 2 is an example diagram illustrating a data integration platform for a composable analytics environment, according to an example embodiment.

FIG. 2 is an example diagram 200 illustrating a data integration platform, according to an example embodiment. Diagram 200 shows integration with various third-party applications and software, such as, Apache Accumulo, SQL Server, PostgreSQL, Facebook, Twitter, SAS, Microsoft Excel, Matlab, R, C++, Java, cloud data, remote processing, custom user interface, App Store, and the like.

Application Model

In an example embodiment, an application within the composable analytics environment consists of functional blocks combined together with connections to create new functionality. These functional blocks may be referred to as a graphical module of a function (graphical module). The graphical module of a function has multiple inputs and outputs. A graphical module may describe computations that can be performed on computational hardware, such as a computer, server, microcontroller, FPGA, and custom hardware. A graphical module may be analogous to a function in any programming language. The graphical module of a function receives zero to many inputs, processes the inputs, and produces zero to many outputs. These output or output nodes can then be connected to any number of other graphical module inputs.

In some embodiments, an application can reference and call another application. Such a reference application is similar to a graphical module, with its function being to call the referenced application. In this case, to provide inputs into the application, and retrieve certain outputs, the referenced application developer needs to mark certain graphical module inputs and outputs as externalized with additional data (for example, name and description). The application developer can add special graphical modules that externalize inputs and outputs. These external graphical modules in turn become the inputs and outputs in the 'application reference graphical module' in the calling application.

In an example embodiment, the composable analytics environment application model is similar to dataflow models. A dataflow model may be a graphical representation of the flow of data through a process. At its root, the model may be a directed graph, where the nodes are the graphical modules, and the edges are the connections between graphical module inputs and outputs.

Each input and output on a graphical module may have associated attributes such as a name, description, a type and the like. Inputs and outputs are strongly typed, and in some embodiments, the .NET framework type system may be leveraged. Objects of the same type can be assigned, and objects having types that extend base types can be assigned to inputs of the base types. For example, an 'integer' object type may be a base type, and an 'object' object type may be an extension of the 'integer' base type. In this case, outputs of types 'integer' can be fed into a graphical module input of type 'object.' In some embodiments, the composable analytics environment accommodates convertibility between object types. For example, if a user connected an output of type 'string' to an input of type 'integer,' then the composable analytics environment attempts to convert the string to an integer. However, if the string cannot be converted to an integer then it can result in an exception during the running of the application. A user can utilize the built-in conversion framework in the type system, and can also register new input and output types conversions by creating casting operators.

Running of Applications

In one of the embodiments, a common way of running an application is in the composable analytics environment designer. As a user is developing an application, they can run it at any time by clicking the run button. Because an application may be represented as a directed graph, the composable analytics environment knows the order in which graphical modules are to be executed (there can be many valid orders). The composable analytics environment can then loop through this order and synchronously execute the graphical modules. Before each graphical module execution, the composable analytics environment assigns the inputs to the graphical module based on the input connections.

In some embodiments, graphical modules can be executed in parallel. During this type of execution strategy, root modules (modules with no input connections) are initially executed asynchronously from one another. After a module completes its execution and its outputs are set, the execution engine determines which additional modules have fully satisfied inputs. If all inputs are specified, the module is executed asynchronously. This process continues until there are no additional graphical modules to execute, the execution is canceled, or an execution error occurs. If an error occurs or the user requests to cancel the execution, no additional modules are scheduled to execute, any outstanding executing modules are signaled to cancel, and the execution engine waits until the currently executing modules are complete before completing the entire application execution process. Execution can be safely executed in parallel because of the application model, in which modules define their state entirely as inputs, and dependent modules are defined through connections.

Although the user is creating and interacting with the application in a web browser, in an example embodiment the actual execution of the application occurs in the backend web servers, and status and results are communicated in a real-time manner. In some embodiments, if a graphical module in an application is a web service, it results in computations or queries on remote systems outside the composable analytics environment server. Whenever the application is run from the user interface, the entire application model in the browser is sent to the application web service for execution. This is required when the user may want to change the application and run it, without saving the application to the application persistence store (for example, a database).

Figure 3:
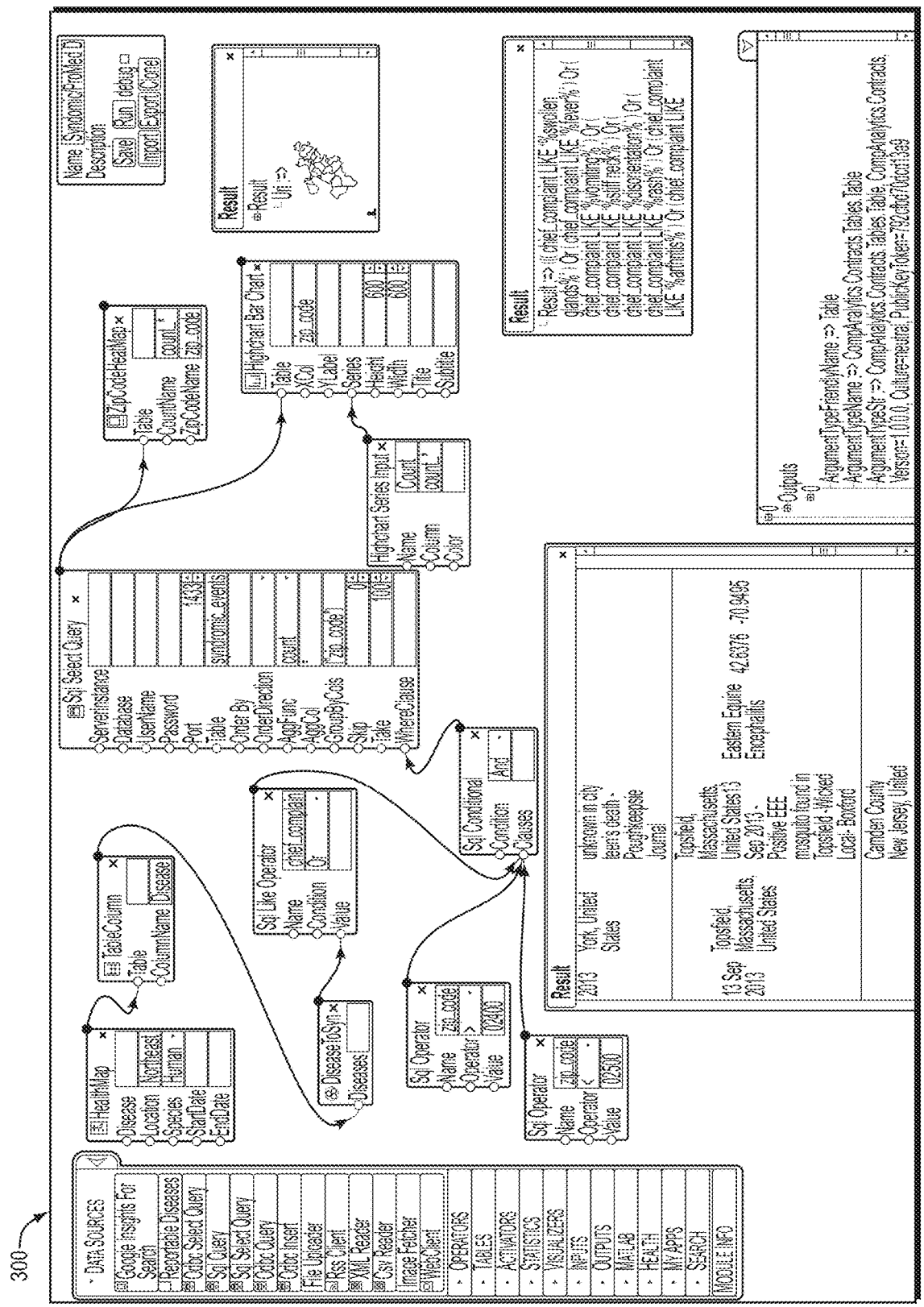
FIG. 3 is an example user interface illustrating an application designer with intermediate results for a composable analytics environment, according to an example embodiment.

FIG. 3 shows an example user interface 300 illustrating an application designer with intermediate results, according to an example embodiment. User interface 300 includes various graphical modules connected to each other via inputs and outputs and results of intermediate graphical modules.

Debugging Applications

In an example embodiment, the composable analytics environment provides a debugger to aide in troubleshooting the creation and running of applications. Users can step through an application run, halting execution after each graphical module execution. This allows users to understand the order in which graphical modules are running and also look at intermediate outputs. If an application calls another application, the user can 'step into' the referenced application and debug the referenced application run. If the user has read and execute permissions, the referenced application and the current execution context is loaded in another designer tab within the user interface, where the user can then step through and debug the reference application like the parent application. Once complete, the user can then switch back to the parent application to continue debugging the current run.

In some embodiments, the debugging feature can be enabled or disabled. If debugging is enabled, the execution context is set with a debug flag, and the application executor on the server waits for a "step" call from the user before continuing execution. A "step" call may be an input from the user to move to the next step in execution. If the engine is stepping over a graphical module, the step call returns the results of that graphical module, and also notes the graphical module that is executed next. In this manner the user interface shows the user which graphical modules have been executed, and which graphical modules are to be executed next. If the graphical module that is executing is a reference application graphical module (i.e. the graphical module references another application), the step call returns handle information, and the user interface launches another tab in the designer loaded with the referenced application in debug mode. The calling application waits till the referenced application is complete, similar to other graphical module step calls.

Error Handling

If an error occurs during an application run, an exception is presented and the run is stopped. An error can result while validating inputs, processing errors, connection errors or timeouts. If a graphical module throws the error, then the graphical module is bookmarked, and the error is displayed on the correct graphical module in the designer. If the exception is due to the assignment of a graphical module output to an input, then this information is bookmarked and the input and connection is highlighted in the designer for the user. Thus, the users can understand and resolve the root causes of application errors.

Figure 4:
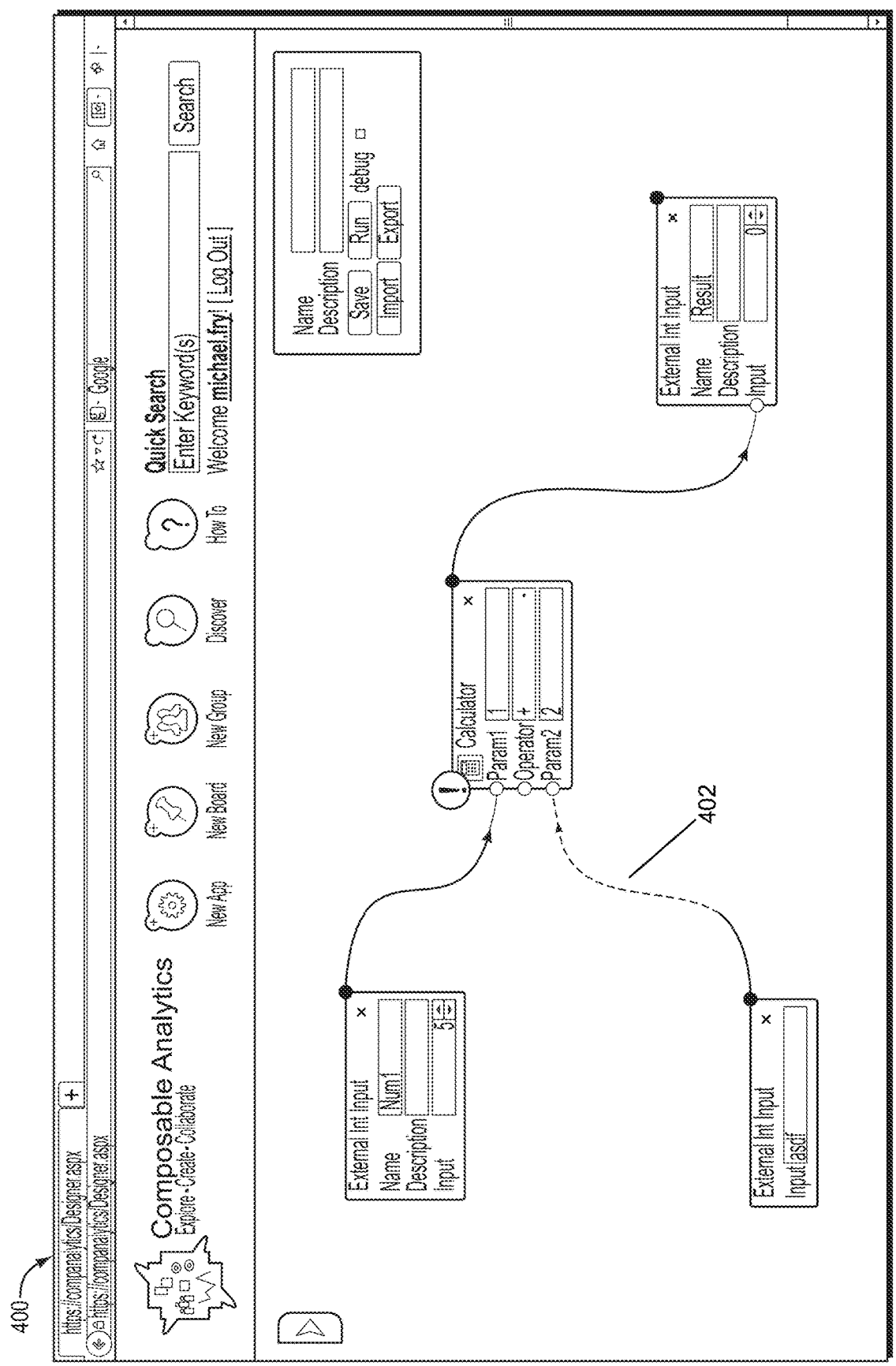
FIG. 4 is an example user interface illustrating an error presented to the user during an application run in a composable analytics environment, according to an example embodiment.

FIG. 4 shows an example user interface 400 illustrating an error being presented to the user during an application run, according to an example embodiment. User interface 400 shows one of the connections highlighted (as shown by dotted arrow 402). In this example, the error is produced at least due to an error with the highlighted dotted connection 402. The graphical module "Calculator" has an exclamation point adjacent to it. In this example, the exclamation indicates that the error is produced at least because of the "Calculator" graphical module.

Sandboxing User Code

Since, it is difficult to predict and develop all of the graphical modules that a user may need, the composable analytics environment is designed so that inserting new functionality is easy, and various tiers of flexibility are provided. One of these tiers of flexibility allows users to employ a 'just-in-time coding' methodology. It is risky to allow any user to develop a graphical module and let the composable analytics environment trust its execution. To provide flexibility, and also meet security requirements, a 'code-graphical module' is provided in the composable analytics environment in an example embodiment. Similar to other graphical modules, the code-graphical module has inputs and outputs. The input to code-graphical module is user code, which may be written in C#, VB.NET, or any other appropriate programming language. The user code is compiled and run in a partial trust application domain, also known as a 'sandbox.' A partial trust application domain may be an application domain that has limitations on the functions and properties that a user can access or modify. In one embodiment, users are not able to access the file system, registry, or network in the sandbox domain. Users may also have limited memory and runtime constraints. Because the code is an input into the code-graphical module, a user may create some very dynamic programs. Applications may receive code from external sources like emails or web services, and modify the code based on other factors while the application is running.

When using a code-graphical module, the user specifies the language, class name, and method that to be called in the sandbox. In addition, the code-graphical module also takes in a collection of inputs. These inputs correspond to the parameters in the method. For example, if the method takes in three objects (string, table, integer), then the application designer links up three connections to the method input collection. Methods can also be defined with a variable number of arguments. The number of arguments is then determined by the number of input connections, or specified in the input control. The output of the graphical module may be of type object. This corresponds to the return value of the method called in the code. If the method returns a void, then null is returned.

Execute Matlab Code

The execution of Matlab code is also supported. There are however, several differences in the way Matlab code is executed versus sandboxing .NET code. Matlab's automation server can be used to host an instance of the Matlab runtime, and the automation server's Application Programming Interfaces (APIs) can be used for creating workspaces, executing commands, and retrieving and setting variables in the runtime. To mitigate the security issues, the automation server is executed under a limited user account. However, even under a limited user account, there are still many operations that are prevented, such as, directory browsing, creating files, and the like. Therefore, in one embodiment, execution of the Matlab graphical module may only be supported for certain user accounts. In one embodiment, graphical module types are securable resources similar to other resources, such as, applications, boards, and groups. In this manner, administrators can change the permissions on an individual graphical module type, and restrict users from executing certain graphical module types. Permissions may include, but are not limited to, discover, execute, and write.

In some embodiments, each run of an application that contains a Matlab graphical module creates a new workspace in the Matlab automation server, providing isolation from other application runs. The Matlab code may be a single function or may be a series of commands, and may add and update variables within the workspace. For this reason, execution is slightly different then the .NET code graphical module. There are at least three graphical modules that the application designer uses to interact with Matlab. The first is the "Put Variable" graphical module, which puts a value from the executing application into the current Matlab workspace. Data with atomic types (integer, string, double, and the like) and multi-dimensional arrays are supported. The second "Matlab Code" graphical module executes the specified command in the current workspace. To retrieve values from the workspace, the designer can use the third "Get Variable" graphical module which retrieves a variable from the workspace, and set the graphical module's single output value using the Matlab variable.

Plugin Development

The palette of graphical modules the user can choose from dictates the kinds of applications that can be created, and also steers the information domain and use of the composable analytics environment. Therefore, the composable analytics environment is designed so that it is easy for a developer to add new graphical modules quickly. An 'App Store' may be provided to include new visualizations and first-class graphical modules into the composable analytics environment. First-class graphical modules may be a set of default graphical modules provided within the composable analytics environment to a user as a starting point. A business case and revenue stream for developers to submit new graphical modules may be provided based on the application area needs and constraints.

Graphical Module Type

Creating a new graphical module type is a primary extension point a developer can make use of in the composable analytics environment. The graphical module type defines its name, description, icon, category, inputs, outputs, metadata on the inputs and outputs, and the actual class that is to be executed when an application is running. These 'first class' graphical modules may be written in any Common Intermediate Language (CIL) compliant language. Some of these languages include, but are not limited to, C#, F#, C++, VB.NET, IronPython.

FIG. 5 shows example code illustrating a simple graphical module that performs a mathematical operation on two numbers. One of the methods is the Execute( ) method, which is called when it is the graphical modules turn to run.

Within the Execute( ) method, the graphical module can get access to the values of its inputs (whether the values are coming from connections, or set directly on the inputs), perform any processing it needs, and then sets its output values. The inputs and outputs are set as properties on the class. ModuleInput< > and ModuleOutput< > are generic classes, and the use of these determines the type of data they can accept or return. In addition, an input control is also specified in this example. In this example, the mathematical operator can be chosen from a pre-configured list through a combo box. By adding a control attribute to the input, the user interface knows to use the specified control when the user wants to enter in the input.

Below is description of an example graphical module type implementation.

Types

When defining a graphical module type, the data types for each of the graphical module's inputs and outputs are specified in the property declaration. These types determine which information may be sent between graphical modules, and defines how graphical modules interact with each other. Graphical module type developers can simply create new data types by creating a new class and then using that class when defining a new graphical module input or output. These types may be serializable so that the information may be sent to the user interface, and also saved to the composable analytics environment database. Because these types are known at compile time, registration and loading of the types is inherent in the .NET framework.

Input Controls

Input controls allow users to set the value of a graphical module's input. All values may not be provided from connections, so the graphical module developer can provide an easy way for choosing values. Developers can register new input controls in the composable analytics environment. Graphical module developers can make use of these by adding the input annotation to the input property in the graphical module type class. When creating a new input control, there are several components that may need to be created.

Using the Registering Attribute Control, graphical module developers can let the composable analytics environment know to use the control type on the specified input. Any options on the user interface controls are also often specified here. In the example above in FIG. 5, the graphical module developer used a ComboBoxControl attribute so users can choose the mathematical operator from a dropdown menu. The registering attribute control may also specify the JavaScript file containing the user interaction methods.

The Data Parameters Class defines any optional parameters that may need to be serialized and sent from the services to the user interface when loading the input controls.

The Java Script Control extends from a base InputControl class and implements several methods. Some of these include operations for setting the input value, rendering, and getting the value from the control.

Output Rendering

Developers can also register how certain output types are rendered. Unlike input controls, which are defined at the graphical module input level, output rendering affects all graphical module outputs with the same type. Inputs often need different ways of getting data from the user, even if the type is the same. For example, if the input is of type string, some graphical modules may need a dropdown list of predefined values, while other graphical modules may need a textbox. However, if the result is a string, then typically a textbox displaying the string is sufficient.

Activation

In some embodiments, applications do not have to be run by the user. Users can design applications to be triggered by other external factors, such as, time, email, web requests, and the like. If a user wants to run an application at the same time every day, the user can add a timer graphical module, for example, to their application and set the specific schedule. The composable analytics environment has an activation service running in the backend tracking applications with timer graphical modules, and checking whether it is time to run the application.

The composable analytics environment also has a server periodically checking a system email inbox for application emails. For example, if an email is received with an application id, the message contents are assigned to the email graphical module inputs, and the application is run.

An application may also act like a web service or a web page. The users can simply drag a 'web receive' and a 'web send' graphical module into their application. Users fill in the logic of processing the request and assigning the response with more graphical modules and connections. The web request activator running in the backend receives web requests, and determines which application needs to run based on the specified application id in the request. The service then assigns the web request contents to the web receive graphical module and runs the application. The activator then takes the results from the application and assigns them to the web response. Users can not only coordinate calls to web services, but now they can graphically program the internal workings of web services. Callers of the application web service may need execute permissions on the application. The web request for the application may have a correct authentication cookie, or if everyone is given 'execute' permissions on the application, then an anonymous web request can be accepted.

Figure 6:
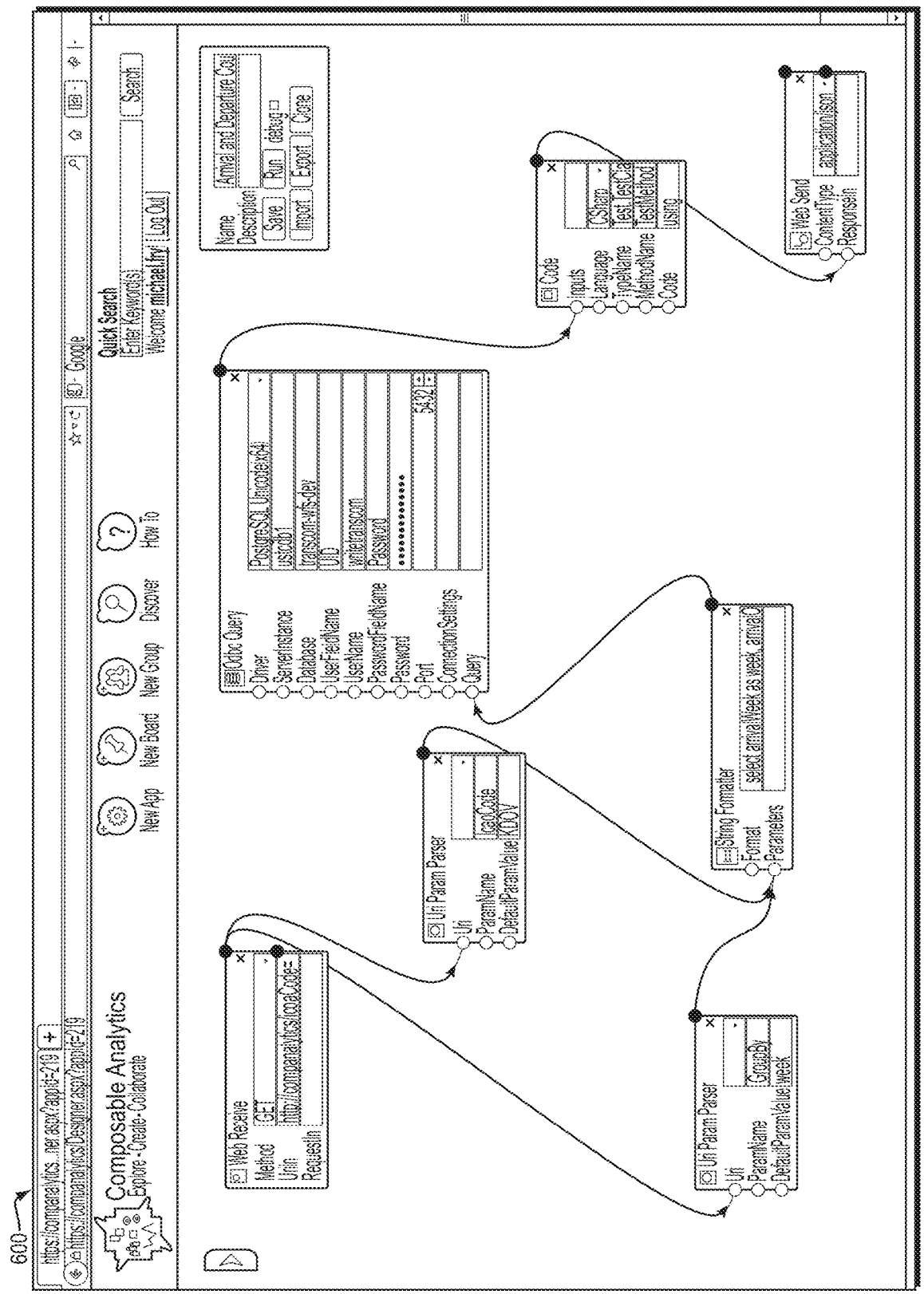
FIG. 6 is an example user interface illustrating an implementation of a web service in a composable analytics environment, according to an example embodiment.

FIG. 6 shows an example user interface 600 illustrating an implementation of a web service, according to an example embodiment. User interface 600 includes various graphical modules creating an application associated with an example web service.

Results

As applications are executed by users or through external activation, runs are produced. A run consists of results for each graphical module's outputs. Results are strongly typed objects, and correspond to the output of a graphical module. Examples of results include, but are not limited to graphs, charts, maps, strings, integers, tables.

Runs and results can also be securable resources, similar to applications and boards. In one embodiment, a run and its included results share the same access control entry. In an alternative embodiment, a run and its results may have different access control entries.

Discovery and Exploration

Reusability is another beneficial feature of the composable analytics environment, and to promote reusability, users need a way to easily find existing applications. There is a search capability for users to find the five main resources in the system: users, applications, boards, groups, and results. Users can search by keywords and specific attributes on the resource. A full text indexer is used on the names and descriptions of the resources. For example, a user can search for applications that contain 'tornados' in the description and the structure of the application contains a visualization graphical module of type 'line chart.' In some embodiments, the search may only produce search results of resources that have discover permissions associated with them. Search results may be an intersection of key words, attributes and permissions.

Figure 7:
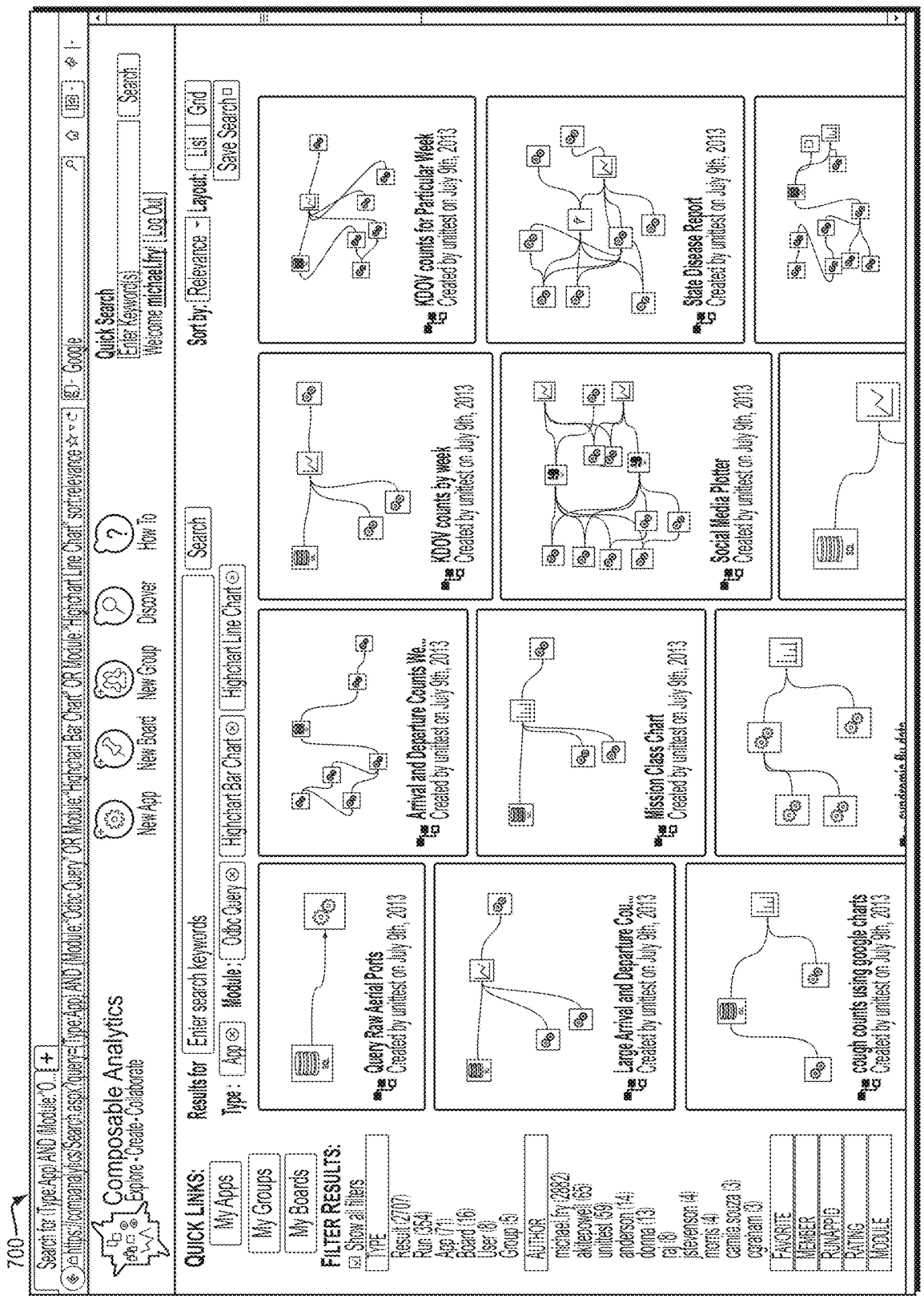
FIG. 7 is an example user interface illustrating a page showing application previews in a composable analytics environment, according to an example embodiment.

FIG. 7 shows an example user interface 700 illustrating a discover page showing application previews, according to an example embodiment. A user can easily view applications and graphical modules in this manner, and select any of them to use based on his needs.

Boards

Some embodiments provide 'boards' for users to organize application results and information in a meaningful way. For example, the result of an application may be a graph, but a lone graph does not have any context or anyway to compare itself with other graphs. To resolve this issue, users can pin the graph to their board, drag it to the appropriate location, and enter text describing the result and also compare it to other graphs on the board. Boards may be similar to wikis or web page development where they give users flexibility to develop a view of their data. In some embodiments, boards are purely visual. Users do not need to know a wiki language or HTML. Users may simply drag, resize, enter text, and adjust attributes like color and font size of their results.

Boards can be shared and multiple users can contribute results to a particular board. Boards can be automatically updated by applications publishing results to a board. Communities may be formed around boards, consisting of users that either want to contribute to or stay informed about a particular information domain. Boards may contain a list of board items. A board item is associated with a resource (application, result, group) and also contains some additional metadata about the visualization of the resource. Some metadata attributes for a board item includes, but is not limited to, name, color, font, size, and position.

Live Elements

As resources are created, changed and used, this information is recorded into an activities table. Users may view the actions/activities performed on various resources. For example, if an application has been updated and run, the activity log shows which user updated the application, and also who executed it recently. These lists can be pinned on an individual user's board, and is updated whenever changes occur. In addition, search queries for resources in the composable analytics environment can also be placed on the board. For example, if the user wants to see new applications that have been created in the system, he can create a search query, post it to his board, run the query whenever he wants, and view a live element list of the results on the board.

Resources

All types of resources can be added to the board. In some embodiments, previews of the resources on the board are visible, allowing users to quickly jump to and make use of the resource.

Figure 8:
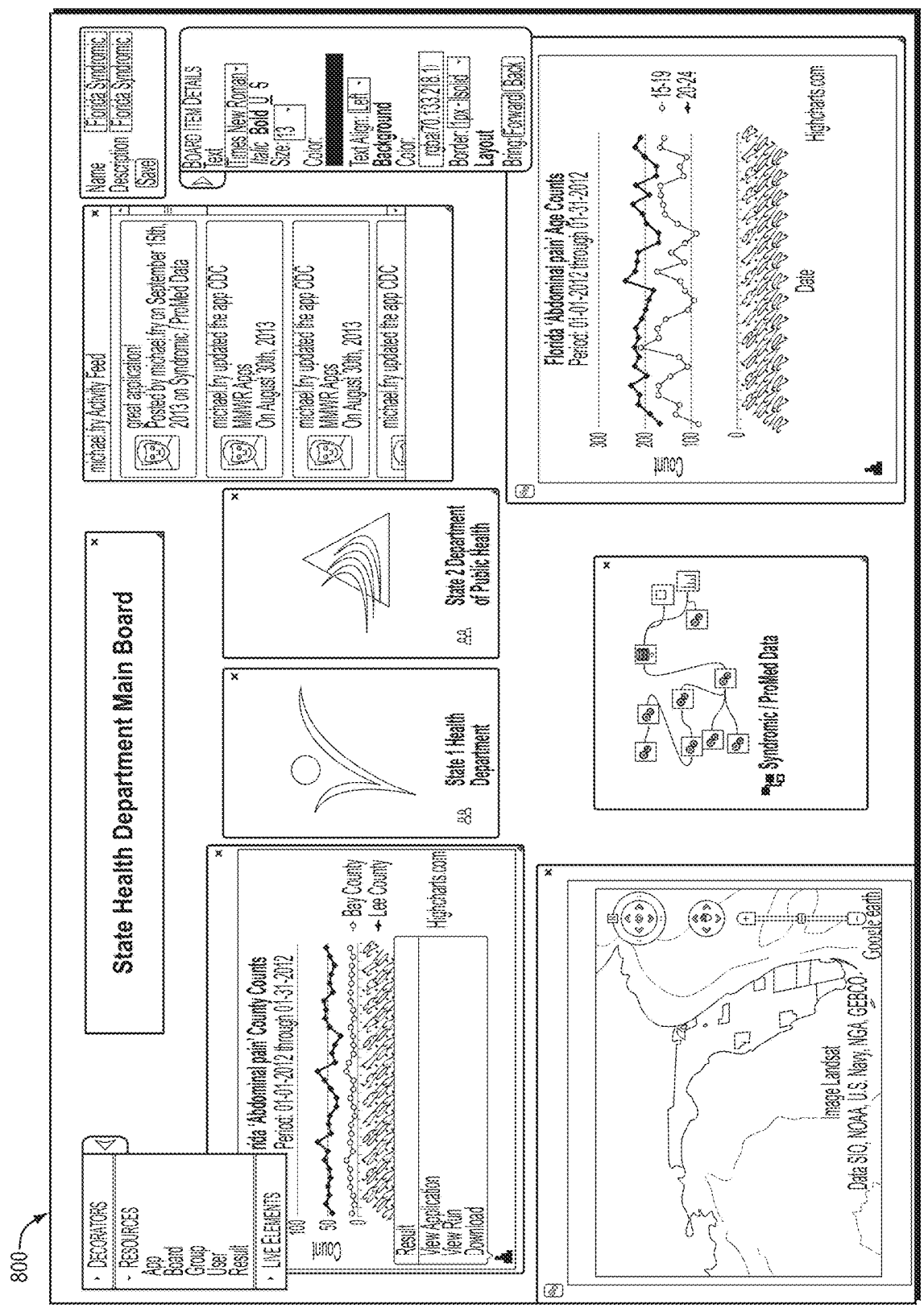
FIG. 8 is an example user interface illustrating results and applications organized on a board in a composable analytics environment, according to an example embodiment.

FIG. 8 shows an example user interface 800 illustrating results and applications organized on a board, according to an example embodiment. User interface 800 includes applications, various results produced by an application, and reviews or comments from users.

Main Dashboard

Some embodiments provide main dashboards in the composable analytics environment. Main dashboards function and store like any other board; however, when a user logs on, the user is redirected to the main dashboard. As such, the dashboard may be like a home page or home screen in the user interface of the composable analytics environment. Users can customize their own dashboard. In an example embodiment, dashboards can be shared like any other board. In alternative embodiments, only the owner may have access to his dashboard. In an example embodiment, by default the dashboard displays live elements for favorite boards, groups, and applications. Other live elements that may be displayed in the default dashboard includes newly created and highest rated applications. While users can post results to the dashboard, users can use the main dashboard as a quick link to resources.

Groups

Groups are another type of resource in the composable analytics environment and serve two primary purposes. Firstly, groups provide a collaborative mechanism, allowing users of common interests to find each other. Secondly, groups aide in securing other resources within the system. Rather than giving permissions at the individual user level, permissions can be specified at the group level. For example, if only certain people are to have write permissions to an application, a group can be created and assigned write permissions to the application, then users can be added to that group.

Users can be added to the group by the group owner (for example, the user who created the group), and also by any other user or any other group having write access to the group. Users can also request to join a group. Group owners may be sent a message via an email, for example, when a join request is created, and owners have the option to accept or reject it.

Security

There are several security infrastructure mechanisms in place in the composable analytics environment. At a transport level, all web traffic can be encrypted and sent over Secure-Socket-Layer (SSL). Web server and activation processes can run as limited privilege accounts (e.g. ApplicationPoolIdentity, NT Authority/Network Service). Database access can be accomplished using accounts that have the minimum rights necessary for retrieving and saving the data.

Application designers are provided a considerable amount of power when using graphical modules. For example, a user can issue web requests to remote web services, run queries on external databases, run custom code graphical modules, and automatically send emails. Great measures need to be taken to not only protect the composable analytics environment from malicious users, but also protect users from one another. Employing web proxy and spam filters, and sandboxing user code can mitigate some of the malicious use cases, but resource quotas may also be implemented. Users may also have the tools to secure their applications themselves. Users may have the ability to specify granular permissions on applications, such as, who can execute, write, and read private variables.

Accounts

User accounts may be created similar to any other website. A general registration workflow steps may include the following:

(1) A user creates an account through a web form;
(2) Email is sent to user ensuring a valid email exists;
(3) The user clicks on a verification link in the email;
(4) An email is sent to an authoritative person to accept or reject pending the account;
(5) If the account is accepted, then the account is enabled; and
(6) Email is sent to the user letting them know the account is usable.

Some email addresses can be automatically approved by the composable analytics environment. If an email address domain is white-listed, then an authoritative person may not need to review the request. Once the account has been verified, it is automatically enabled.

Resource Permissions

In some embodiments, the composable analytics environment promotes sharing by making graphical modules available to all users, however, users may still need the ability to have fine-grained permissions on their applications and data. By default, any resource created by a user can only be seen by that user. A user can assign either another user or group particular permissions to access a resource. For an application, the permissions may include, but is not limited to, 'discover', 'read', 'write', 'execute', and 'clone.' For boards and groups, the permissions may include, but is not limited to, 'discover', 'read', and 'write.' There may be a circular dependency between groups and permissions. This allows users to create interesting permission functionality like allowing individuals within a group to see who else is in the group. This can be achieved by giving the group read access to itself.

FIG. 9 shows an example user interface 900 illustrating an example access control list for an application, according an example embodiment. The permissions include read, read-private, write, execute, clone, discover, and delete. Users can be added or removed, and assigned a type such as role, user, and group.

Social Media

In an example embodiment, the composable analytics environment is integrated with social media sites, such as Facebook and Twitter, so that users can share what they're working on. Users can link their Facebook and Twitter accounts to the composable analytics environment using the Oauth protocols and provide the composable analytics environment permission to post on their behalf. The composable analytics environment may include Facebook and Twitter graphical modules as first-class graphical modules that allow users to automatically publish either text or images to their feeds, query for information, or manage resources within the external systems. Users may automate and script daily public status updates.

Automating social media web applications is another domain that the composable analytics environment can be used in. Users can create processing schemes to automate the process of posting to Facebook and other social media sites. A user may create an application within the composable analytics environment that integrates an approval process for posting daily updates to a social media site.

Figure 10:
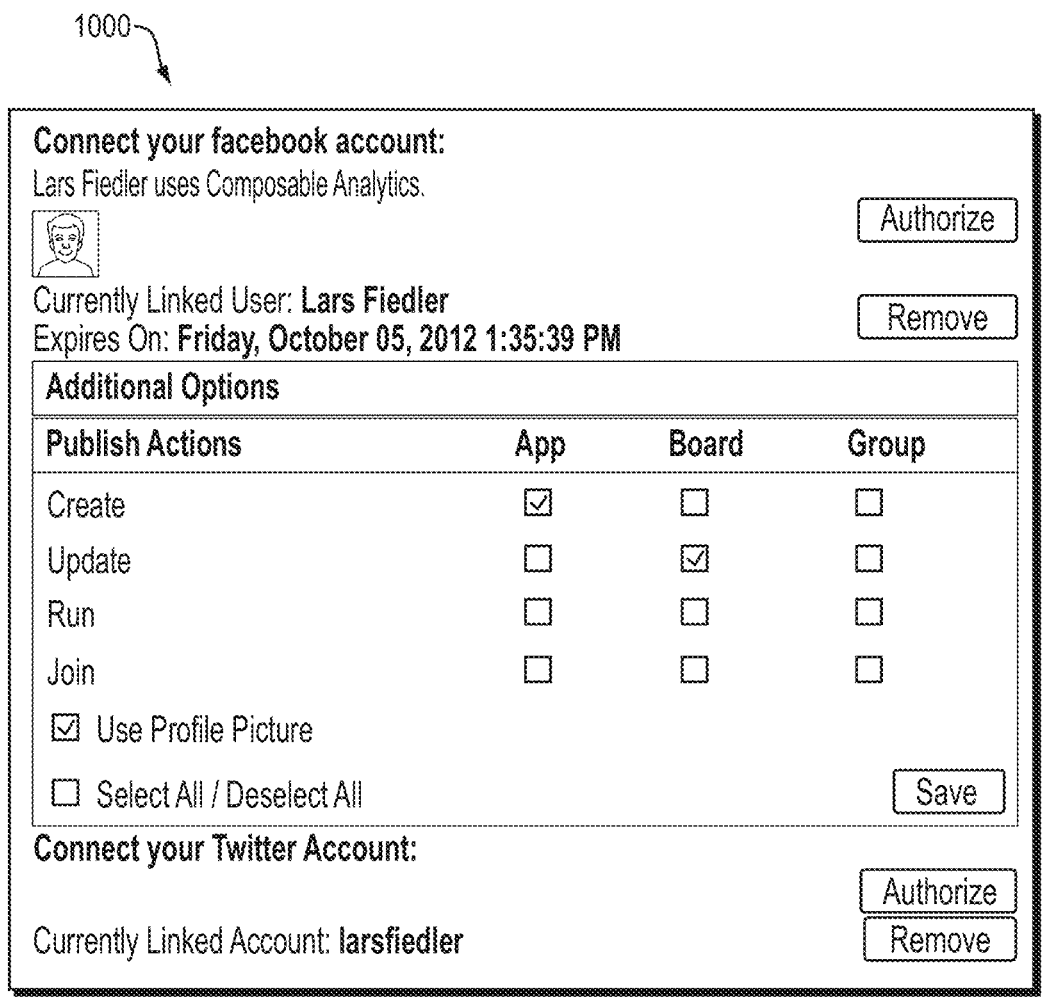
FIG. 10 is an example user interface illustrating options for linking social media accounts in a composable analytics environment, according to an example embodiment.

FIG. 10 shows an example user interface 1000 illustrating options for linking social media accounts, according to an example embodiment. User interface 1000 includes various publish options for a social media site. In this example, an activity may be published to Facebook when an application is created, and when a board is updated.

Activities

As users create and run applications, or make updates to boards and groups, these actions are recorded. Users can then view the activities of other users, or for a particular resource. The activities a user can view may be an intersection of the discover permissions associated with the resources referenced in the activity.

Comments

Users can comment on resources like applications and boards and create threads of messages, such as, what they are using the application for, what issues they ran into, and the like.

Reviews

Users may be able to review applications and provide feedback on their functionality. This provides other users information on how well the application performs and which application may be the best fit for their needs.

Figure 11:
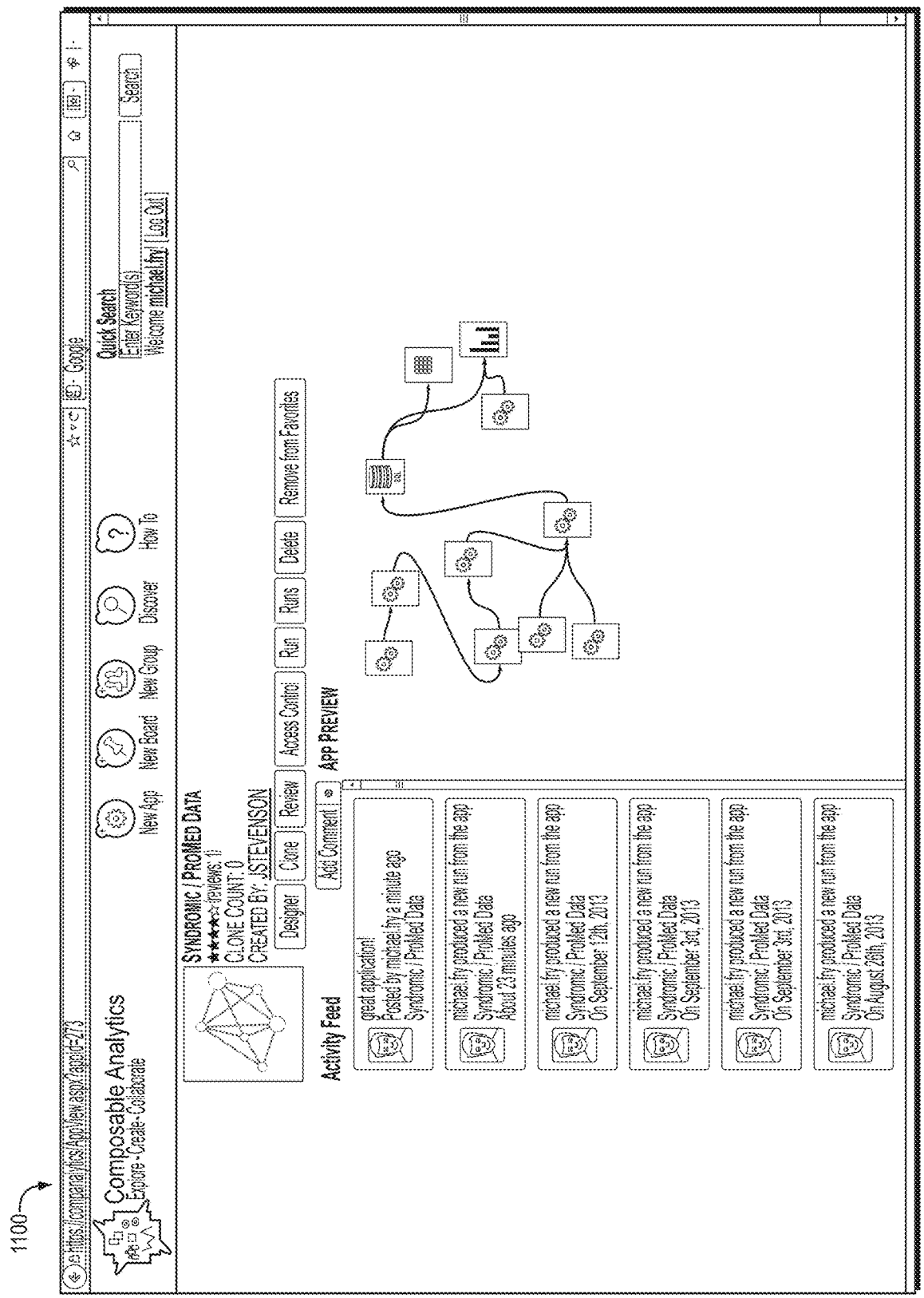
FIG. 11 is an example user interface illustrating an application page showing activities, comments, ratings, and previews in a composable analytics environment, according to an example embodiment.

FIG. 11 shows an example user interface 1100 illustrating an application landing page showing activities and comments, rating, preview, according to an example embodiment. User interface 1100 illustrates comments on the left, user rating on the top, and application preview in the center.

Usability

The composable analytics environment is for users and is made beneficial by users creating more applications and graphical modules. Users need to be able to modify and create applications easily. To make using the composable analytics environment easy, training videos demonstrating how to develop applications within the composable analytics environment may be provided.

Example Applications

Because using a graphical module within an application may be difficult to figure out for a first-time user, a graphical module may have an example application associated with it. With a click in the application designer, users can open an example application and understand how the graphical module may be used. These example applications may be executed without any modifications. Example applications can be created by the graphical module developer, or created and registered by the administrator of the composable analytics environment.

Descriptions

Each graphical module and its inputs and outputs contain descriptions on what they do and what values are expected. These can be visible when a user hovers over the graphical module with a pointing device, like a mouse cursor. Understanding a graphical module's inputs, its functionality, and what it returns is helpful to a user in using the composable analytics environment.

Software Architecture

In an example embodiment, a multi-tier architecture is used: user interface/web pages, web services, a database, and external systems. The front-end user interfaces may be developed using .NET Aspx web pages, jQuery, JavaScript, and CSS. The pages are loaded from the web server, which then make Ajax requests to the web services (middle tier). The web services provide a means of serving up data to the web pages and also allows for web clients to save data. The web service layer is also how clients execute applications and get information on the lifecycle of an application. All the web services are hosted in an IIS web server. The processing of triggers occurs in the activation host. The activation host receives emails, web requests and timer events, and runs the corresponding application. The activation host also communicates with the database to load applications for execution and store the results. Applications can communicate with external systems, such as web services, databases, and parallel computing grids.

Figure 12:
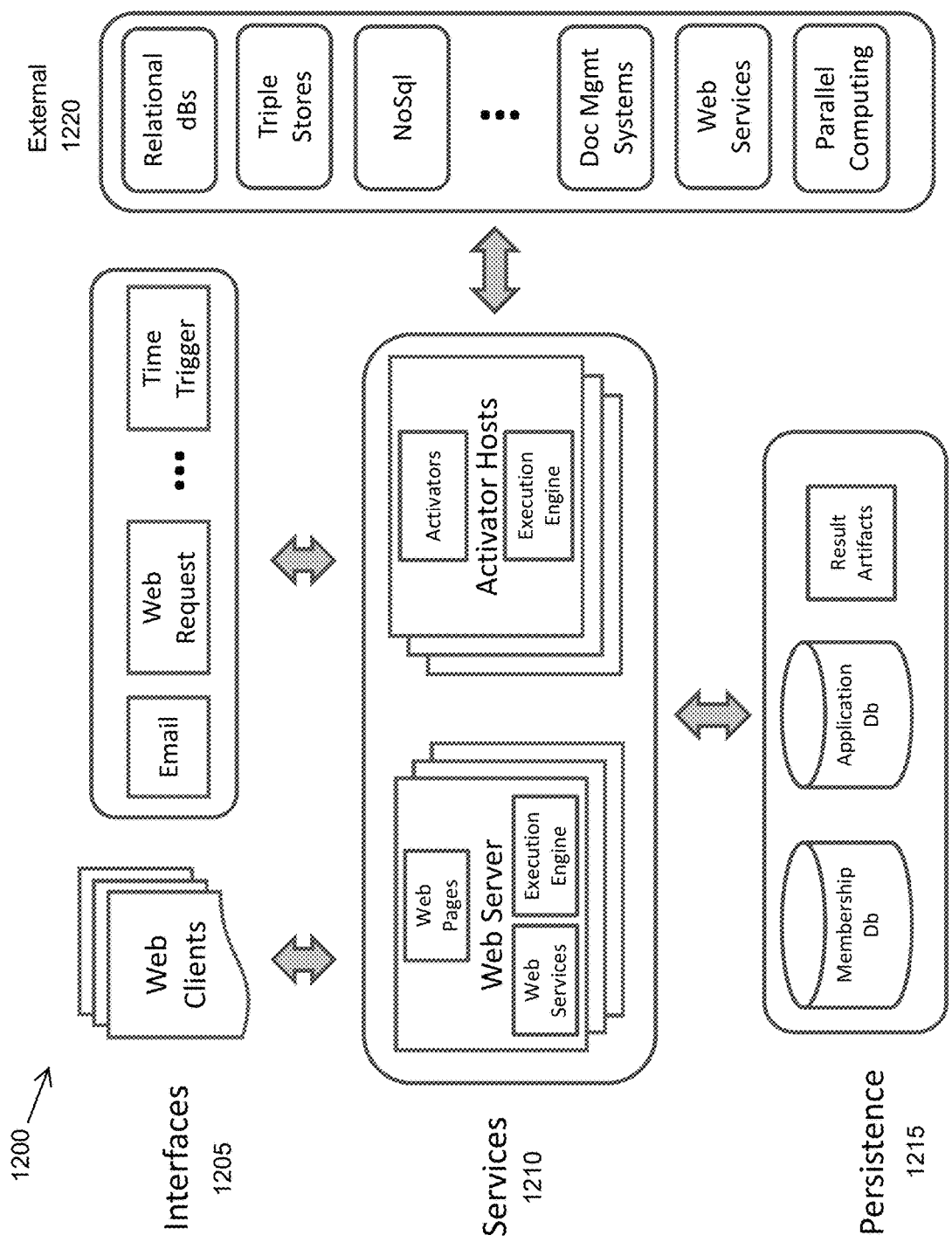
FIG. 12 is an example diagram illustrating a multi-tier architecture for a composable analytics environment, according to an example embodiment.

FIG. 12 shows an example diagram 1200 illustrating a multi-tier architecture for the composable analytics environment, according to an example embodiment. Diagram 1200 includes a first tier for web interfaces 1205, such as web clients, web browsers, email and the like, a second tier for web services 1210 and activation host, a third tier for persistence 1215 including database and identity management, and a fourth tier for external systems 1220.

Presentation Layer

The presentation layer may consist of JavaScript. The jQuery library may support DOM manipulation, third-party plug-ins, and functional structure.

An Asset Service and a dependency chain markup in JavaScript are developed to assist in script dependency scenarios and with possible double inclusion of scripts, in some embodiments. A script dependency issue may arise when, for example, script A may depend on B, which then depends on C. For the page to work, all three would need to be included in the Page—resulting in root JavaScript code knowing about dependency C. If a JavaScript file requires another script to work properly, it places a require comment in its script (//=require otherfile.js).

In addition, root JavaScript files can be loaded through the Asset Service through seed JavaScript loading functions. The asset service loads these root JavaScript files and look for any require tags. If any of them exist, then those files are loaded before continuing to load the current file. The file is not reloaded if it has already been loaded (i.e. 2 files requires the same library). This allows scripts to articulate its dependencies without each webpage needed to include all the possible dependencies in the correct order.

Web Services

All of the web services communicate with the user interface through the JavaScript Object Notation (JSON) wire format. This allows clients and the user interface to easily construct requests and parse the results. Windows Communication Framework (WCF) is currently being used for construction of the web services and data contracts.

Data Layer

A SQL Server relational database is used to store resource data. To interact with the database, the Entity Framework, an object relational mapper (ORM) is used. This data is different from the data that applications often query, and at some level can be considered composable analytics environment metadata.

In some embodiments, because runs and results are considered securable resources, they are stored in the composable analytics environment database. Some results artifacts may be stored to disk. Each application run gets a folder where graphical modules can save information. Examples of files saved to this area include, but is not limited to, CSV files, images, and SQL-lite databases.

Figure 13A:
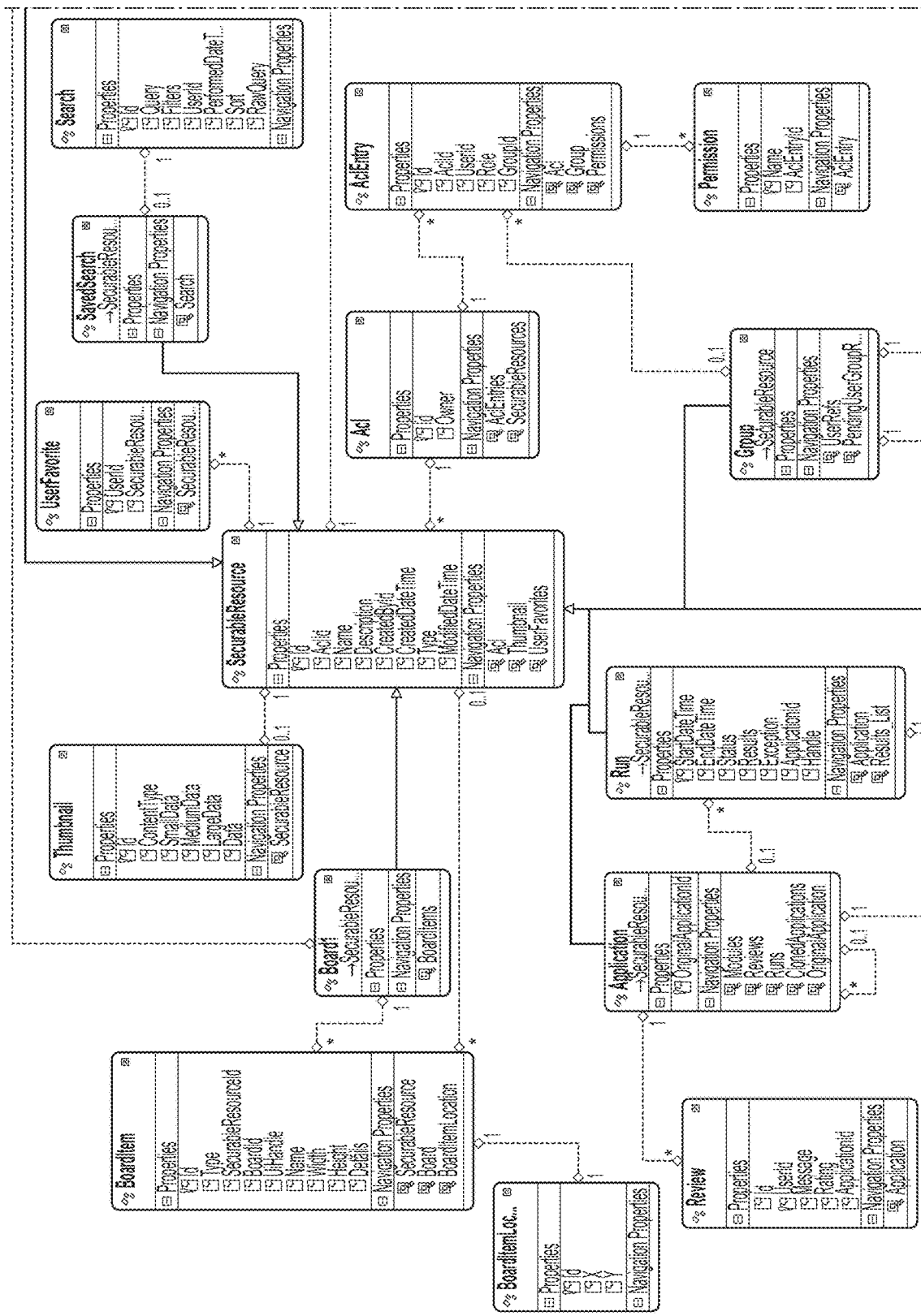
FIGS. 13A-C are an example diagrams illustrating an entity relational model for a composable analytics environment, according to an example embodiment.
Figure 13B:
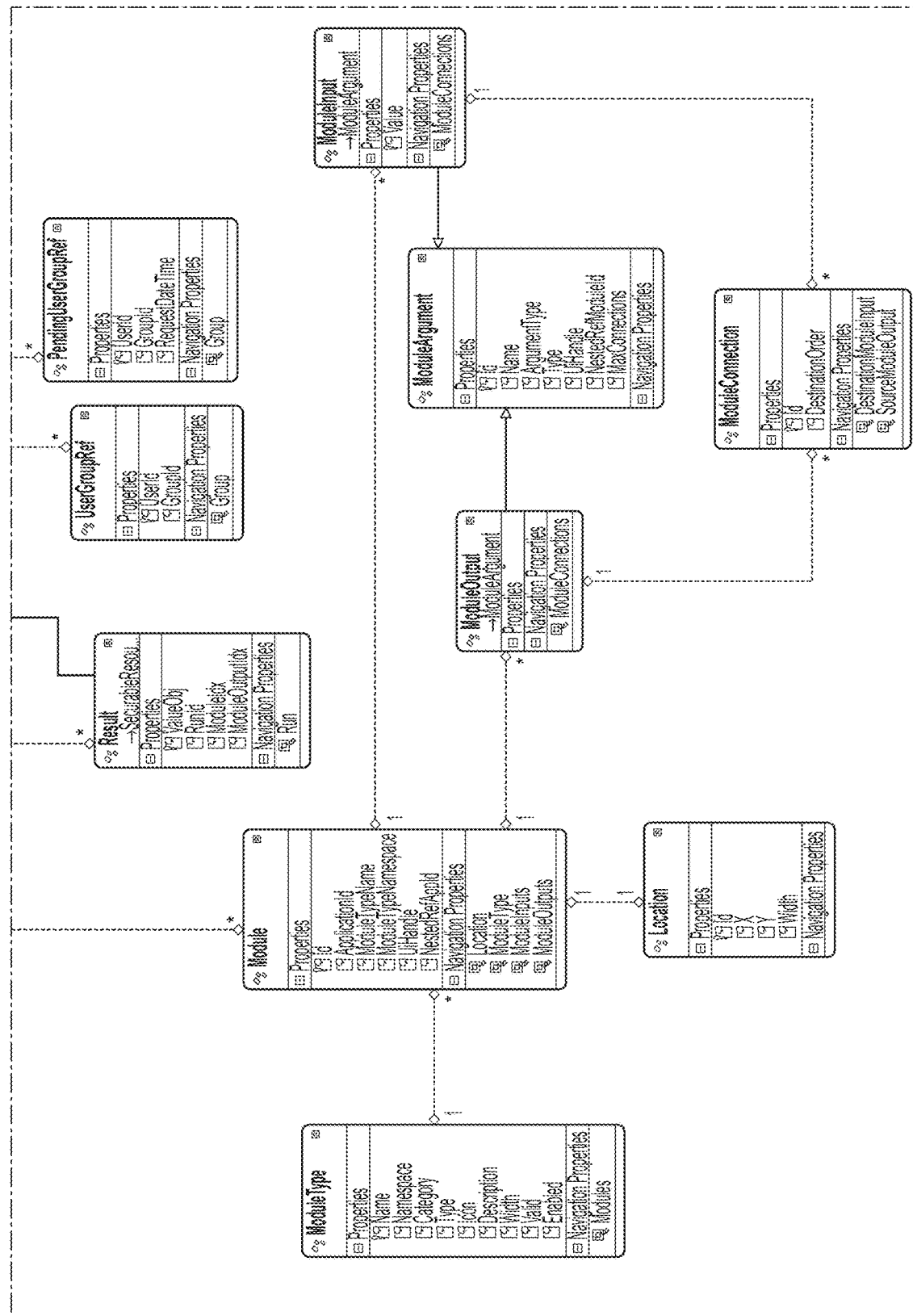
Figure 13C:
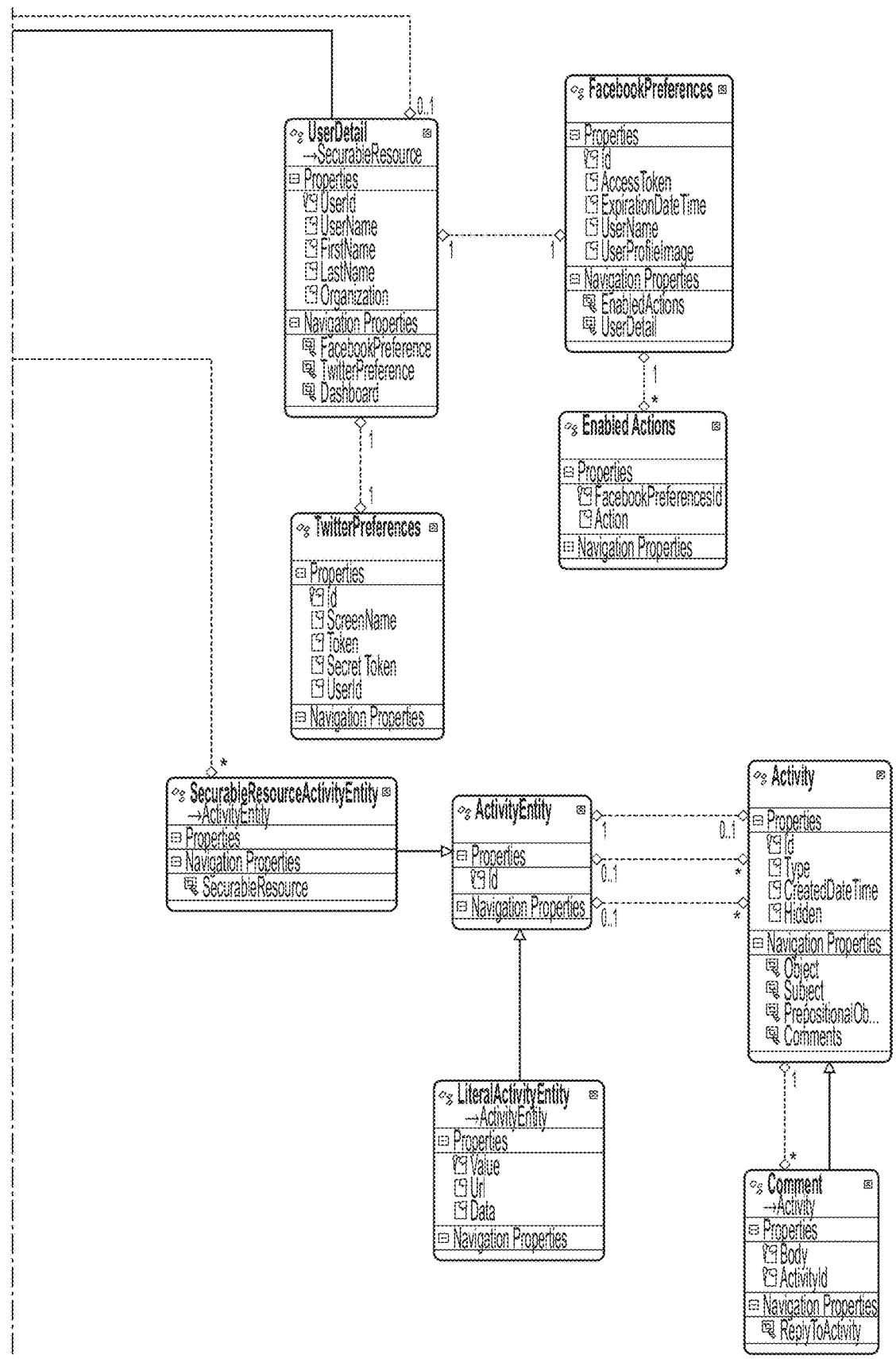

FIGS. 13A-C show example diagrams illustrating an entity relational model diagram, according to an example embodiment. SQL database tables and classes are automatically generated from this model. These classes can be used to store data and create queries to retrieve the data.

Various technologies may be used in implementing the composable analytics environment. The browser used to access the composable analytics environment may be Firefox, Internet Explorer, Google Chrome, and the like. The composable analytics environment may be implemented in HTML, HTML5, JS, CSS, JQuery, and the like. The web server used to deliver the content of the compo sable analytics environment may be Internet Information Systems (IIS). The web server may be programmed using .NET, WCF, ASP.NET, and the like. Activation of the composable analytics environment may be achieved by using NT Services and .NET. The composable analytics environment databases may be managed using SQL Server, SQLite, Entity Framework, Ado.NET, and the like.

CDC MMWR Example

One practical example of the composable analytics environment is using data from the Center for Disease Control (CDC) regarding weekly disease counts for each division and state in the United States. While this information is publically available for anyone to view, little analysis has been done due to the format in which the data is released. This information can be placed in a relational database and applications can be created within the composable analytics environment to query, analyze, and plot the results as desired.

Other industries and fields that can benefit from the composable analytics environment include, but are limited to, pharmaceuticals, health care, insurance, actuaries, and financial markets. One of the many benefits of the composable analytics environment is that the data and the graphical modules plugged in to the system dictate the applicable domains and industries.

Another benefit of the composable analytics environment is that human workflows can be automated by creating applications as described herein. For example, individuals who are looking at social media sites and performing multiple queries on a daily basis can create applications in the composable analytics environment to query the services, bring the data together and push out the updates and relevant information automatically. Applications that synchronize social media web technologies like Flickr, Facebook, and Twitter can also be developed in the composable analytics environment.

Default Permissions

Because the permission model is at the individual resource level, it can be tedious to update permissions for every resource. Users require the ability to update permissions for many resources at once. An example would be, 'update all the runs for a particular app with group x having read permissions.'

In an example embodiment, the default permissions set the owner of the resource as the author, and no other user is on the permission list. While this is the most secure and alleviates issues where items are unexpectedly shared, it can be tedious to constantly need to change permissions. If a user or system executes an application, the user is required to change the permissions after each run if they want to share it with someone else. In an alternative embodiment, the user can set default permissions. An example would be, 'for a specific application, set any future runs to be publicly readable.'

User Resource Quotas

In an example embodiment, users can create and run as many applications as they want, and there are no disk usage restrictions in place. In an alternative embodiment, there are limits on the number of applications a user can run, and the amount of disk space that can be used for results.

Semantic Compatibility

As the number of graphical modules and applications grows, the opportunities for users to be build 'incorrect' applications increases. Not all graphical modules can be connected together. Obviously the input and output types have to be well-matched; but even graphical modules operating on the same types may not be compatible with each other. Additional data that describes the meaning of the graphical modules may lead to better insight in recognizing application 'correctness'.

In an example embodiment, once a reasonable set of graphical module features has been established, an intuitive approach to evaluating the compatibility of the graphical modules within an application is to employ techniques from machine learning to classify the collection of graphical modules as being a potentially successful or unsuccessful analytic. The graphical module feature space would need to indicate which graphical modules are compatible with analytic contexts, which include statistical analysis, data visualization, signal processing, and the like. These features would be discovered through combination of unsupervised learning techniques, such as hierarchical clustering, from graphical module usage statistics as well as indications given by the graphical module developer. Once the classifier is trained on the graphical module feature space, the composable analytics environment can, in the event that an application is classified as potentially unsuccessful, issue a warning to the application designer that the combination of graphical modules selected are not likely to produce meaningful analysis. This allows the user to either redesign the application to be more appropriate for the intended task or run the application anyway. In this manner, the user base can help discover novel uses for existing graphical modules. Provided a sufficient amount of usage statistics, the classification engine deeming an application as successful or unsuccessful can be tuned through observing newer, creative applications in which graphical modules are successfully employed outside of their originally intended analytic context.

In an alternative embodiment where a reasonable set of graphical modules are not available, fuzzy logic can be used to evaluate the compatibility of graphical modules within an application. Upon the creation of a new graphical module the developer is asked to assign the graphical module 'membership' to a set of analytic contexts. Using the analytic context memberships of the graphical modules that comprise it, the membership of the application can be determined. In the event that the application has weak membership to any one of the predetermined analytic contexts a warning is issued to the application's designer. In the event that the designer chooses to run the application in spite of the warning and is pleased with the results (for example the user rating for the application is high) then the analytic context memberships of graphical modules can be tuned accordingly. In another embodiment, once a sufficient amount of usage statistics are available, the approach can be switched to the machine learning approach of compatibility evaluation, or it can be fused with the fuzzy logic approach.

Application Similarity

Finding applications that have similar structure and behavior can lead to an increase in reuse and give users the ability to find colleagues or peers working on similar solutions. This can also help in discovering applications based on inputs, outputs and behavior.

Recommendation Services

In one embodiment, applications can be recommended based on popularity metrics, in addition to other metrics. Popularity of an application can be a function of ratings, number of clones, number of runs by unique users, and the like. By producing an affine combination of these values for each application or board, ranked lists of the most popular applications can be developed. This allows new users to get a feel for the composable analytics environment through pre-vetted resources. Also, popularity rankings provide a foundation on which to build more sophisticated application or board recommendations. For instance, applying filters or key-word searches to the popularity ranking allows users an opportunity to discover existing analyses that may be pertinent to his or her goals.

An example embodiment may include 'helper-graphical modules' which can be recommend to be used in conjunction with a graphical module that a user is creating. For example, many statistical analyses and signal processing procedures may rely on the assumption that the data under observation is normally distributed. A helper-graphical module for one of these graphical modules may be a 'goodness-of-fit' test on the normality of the input data. The user interface may issue an indication that the graphical module assumes the input data to be normally distributed, and recommends the goodness-of-fit helper-graphical module to the application designer.

The table below illustrates a list of graphical modules that may be provided in the composable analytics environment as first-class graphical modules. Some of the graphical modules in the table below may be user-developed graphical modules, instead of first-class graphical modules. As discussed herein, these various graphical modules can be put together to create applications for data analysis.

| Name | Description | Category |
| --- | --- | --- |
| RabbitMQ Subscriber | Activates the execution of the application by receiving a message on a RabbitMQ topic | activators |
| Receive Email | Activates an application by receiving an email with the appId in the subject. The subject should be begin with: <appId> | activators |
| Timer | Activates an application based on the user specified schedule | activators |
| Web Receive | Activates an application by receiving a web request on the URI ~/services/WebActivationService.svc/Activate?appId=xxx | activators |
| Web Send | Sets the response to a web request directed to the application | activators |
| Csv Reader | Reads in delimited data from Uri and returns in table format | datasources |
| File Uploader | Reads and uploads file from the browser machine to the server, and returns its Uri on the server | datasources |
| Google Insights For Search | NULL | datasources |
| Image Fetcher | Retrieves image from specified Uri | datasources |
| Odbc Insert | Inserts table data into a SQL database table | datasources |
| Odbc Query | Queries odbc database and returns data as a Table | datasources |
| Odbc Select Query | Creates a select statement for an odbc database and returns data as a Table | datasources |
| Reportable Diseases | NULL | datasources |
| Rss Client | Retrieves Rss or Atom feed from Uri and returns parsed feed information | datasources |

-continued

| Name | Description | Category |
| --- | --- | --- |
| Sql Query | Queries sql database and returns data as a Table | datasources |
| Sql Select Query | Queries sql database and returns data as a Table | datasources |
| WebClient | Retrieves contents at specified Uri | datasources |
| XML Reader | Reads xml from string and returns in tabular format at specified root | datasources |
| Age Groups | Selects CDC Age Groups | health |
| CDC MMWR Disease | NULL | health |
| CDC MMWR Region | NULL | health |
| Date to Week and Year | Converts DateTime to an Epi Week number and Year | health |
| DiseaseToSyn | Converts a Disease to a list of typical syndromes for the disease | health |
| Florida Counties | NULL | health |
| HealthMap | NULL | health |
| Syndromes | NULL | health |
| Syndromic Data | NULL | health |
| Syndromic Data What | NULL | health |
| Syndromic Data Where | NULL | health |
| Highchart Scatter Series Input | NULL | inputs |
| Highchart Series Input | NULL | inputs |
| String Input | Simply forwards input string to result, allowing for an input to be specified in separate graphical module | inputs |
| Image Hist Equalizer | NULL | matlab |
| Image Intensity | NULL | matlab |
| Matlab | Executes matlab code | matlab |
| Matlab Get Variable | Returns a variable from the matlab workspace | matlab |
| Matlab Put Variable | Sets a variable in the matlab workspace | matlab |
| Plotter | Constructs a plot using matlab | matlab |
| Array Indexer | Returns object at specified index | operators |
| Branch | Conditionally executes graphical modules connected to the then and else results | operators |
| Calculator | Performs numerical operation on two numbers | operators |
| Code | Executes a user coded function in a sandbox | operators |
| Consolidator | Takes in a list of optional inputs and returns the first one in the list. Not all input connections need to return a value. | operators |
| Date/Time Calculator | Performs timespan operation on a date/time | operators |
| Key Value Pair | Constructs a KVP object from incoming Key and Value | operators |
| Replacement Rule | Creates a dictionary of two strings (value and reference value) from two lists of strings | operators |
| Sql Conditional | Combines multiple sql clauses using the specified condition | operators |
| Sql Expression | Constructs a sql clause using column names, operators and value | operators |
| Sql Like Operator | Produces SQL clause by concatenating column name and values with the 'like' operator | operators |
| Sql Operator | Constructs a sql clause using name, operator and value | operators |
| SQL Replacement | Generates SQL query for replacing column values | operators |
| Sql Timestamp Expression | Constructs a sql clause using column names, operators and value | operators |
| State To Counties | Returns counties in a state | operators |
| String Formatter | Combines multiple strings together using the specified format | operators |
| SyndicationToTable | Create a table structure from syndication feed | operators |
| Syndromic Data Demo | Queries syndromic data by disease, county, and date | operators |
| Uri Builder | Creates a Uri object | operators |
| Uri Param Parser | Creates a Uri object | operators |
| Board Publisher | Sends the incoming result to the board | outputs |
| Csv Writer | Writes a table to a file in the Comma Separated Value format | outputs |
| Facebook | Publishes a status update to Facebook | outputs |
| Mail Sender | Sends an email to specified addresses | outputs |
| RabbitMQ Publisher | Publishes a message onto a RabbitMQ topic | outputs |
| Twitter | Publishes a status update to Twitter | outputs |
| Lilliefors Normality Test | Uses Lilliefors hypothesis test to determine if a data set is normally distributed. | statistics |

| Name | Description | Category |
| --- | --- | --- |
| TwoByTwoTable | NULL | statistics |
| Column Type Converter | Converts table columns to the desired type. | tables |
| Table Aggregator | Aggregates the data based on columns and operation | tables |
| Table Column Reducer | Returns a table containing only the columns specified from the original table. | tables |
| Table Column Type Input | Returns user specified table column type | tables |
| Table Filter | Filters the data based on clauses | tables |
| Table Filter Logic Clause | Filters the data based on multiple clauses | tables |
| Table Filter Operator Clause | Filters the data based on operation | tables |
| Table Scaler | Scales a column of a table by a column in another table | tables |
| Table Set Operation | Performs a set operation on a collection of tables | tables |
| Table Sort Column Input | Returns user specified sorting direction of a table column | tables |
| Table Sorter | Sorts a table by column. | tables |
| TableColumn | Pulls out a particular column from a table | tables |
| TableCreator | Creates table based on inputs | tables |
| CountyHeatMap | Creates Kml Heat Map from county tabular data | visualizers |
| DivisionHeatMap | Creates Kml Heat Map from division tabular data | visualizers |
| Google Charts | NULL | visualizers |
| Highchart Bar Chart | NULL | visualizers |
| Highchart Line Chart | NULL | visualizers |
| Highchart Scatter Chart | NULL | visualizers |
| Highchart to Image | NULL | visualizers |
| Kmz | Zips up multiple Kml files into a single Kmz file | visualizers |
| StateHeatMap | Creates Kml Heat Map from state tabular data | visualizers |
| Table to Kml | Creates a Kml file of placemarkers using data in the specified table | visualizers |
| ZipCodeHeatMap | NULL | visualizers |

Machine Embodiments

It is explicitly contemplated that the methods, systems and media presented herein may be carried out, e.g., via one or more programmable processing units having associated therewith executable instructions held on one or more computer readable medium, RAM, ROM, hard drive, and/or hardware for solving for, deriving and/or applying ranking functions according to the algorithms taught herein. In exemplary embodiments, the hardware, firmware and/or executable code may be provided, e.g., as upgrade graphical module(s) for use in conjunction with existing infrastructure (e.g., existing devices/processing units). Hardware may, e.g., include components and/or logic circuitry for executing the embodiments taught herein as a computing process.

Displays and/or other feedback means may also be included to convey detected/processed data. Thus, in exemplary embodiments, the user interface for the composable analytics platform may be displayed, e.g., on a monitor. The display and/or other feedback means may be stand-alone or may be included as one or more components/graphical modules of the processing unit(s). In exemplary embodiments, the display and/or other feedback means may be used to facilitate creation of graphical modules and applications as described herein.

The actual software code or control hardware which may be used to implement some of the present embodiments is not intended to limit the scope of such embodiments. For example, certain aspects of the embodiments described herein may be implemented in code using any suitable programming language type using, for example, conventional or object-oriented programming techniques. Such code is stored or held on any type of suitable computer-readable medium or media such as, for example, a magnetic or optical storage medium.

As used herein, a "processor," "processing unit," "computer" or "computer system" may be, for example, a wireless or wireline variety of a personal computer (PC), microcomputer, minicomputer, server, mainframe, laptop, personal data assistant (PDA), smartphone, tablet, cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include storage medium for storing software, including a hard disk, an optical disk, floppy disk, ROM (read only memory), RAM (random access memory), PROM (programmable ROM), EEPROM (electrically erasable PROM), etc.

Figure 14:
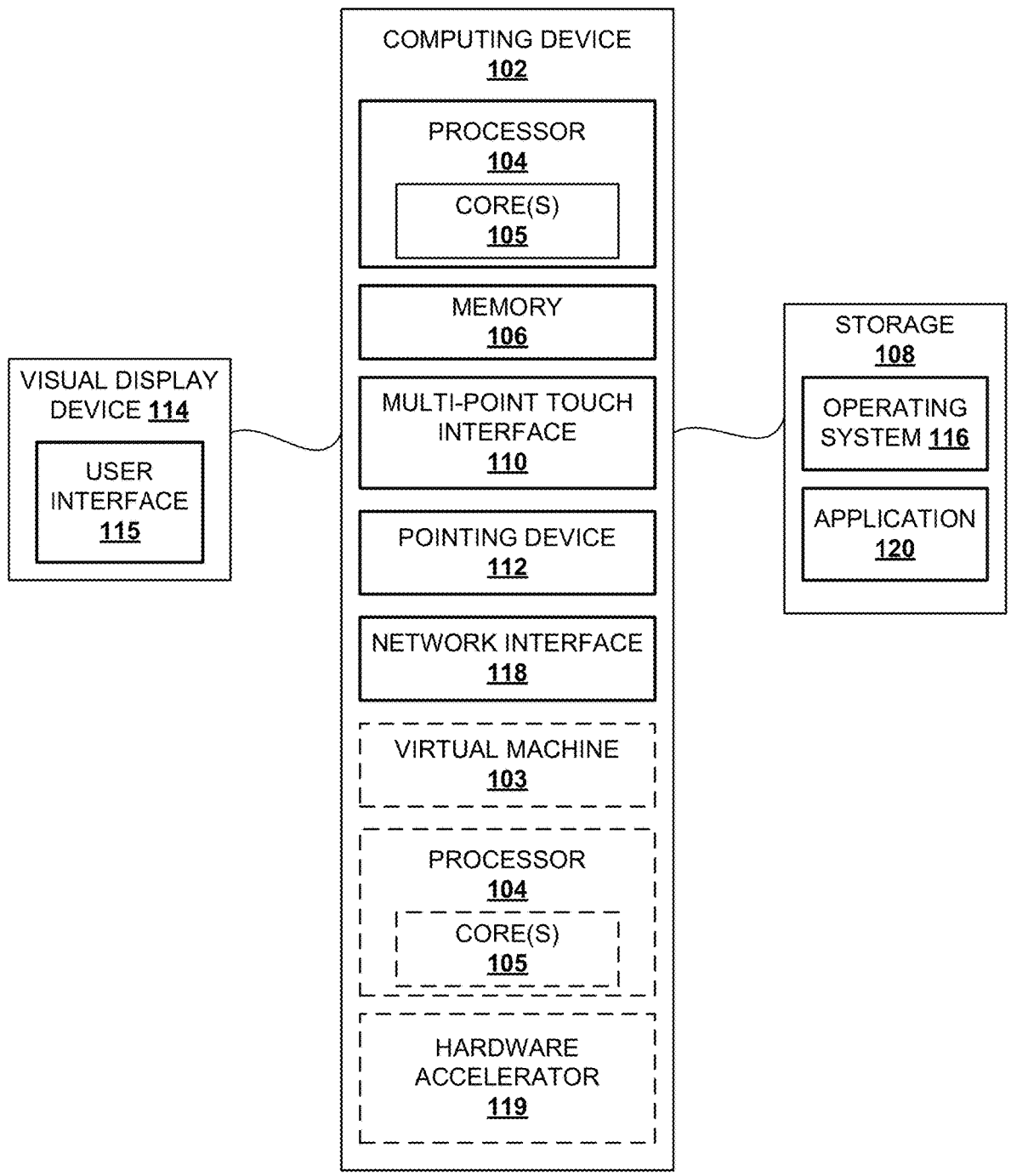
FIG. 14 depicts an exemplary computing environment suitable for practicing exemplary embodiments of a composable analytics environment.

Referring now to FIG. 14, an exemplary computing environment suitable for practicing exemplary embodiments is depicted. The environment may include a computing device 102 which includes one or more media for storing one or more computer-executable instructions or code for implementing exemplary embodiments. For example, memory 106 included in the computing device 102 may store computer-executable instructions or software, e.g. instructions for implementing and processing every graphical module of the application 120.

The computing device 102 also includes processor 104, and, one or more processor(s) 104' for executing software stored in the memory 106, and other programs for controlling system hardware. Processor 104 and processor(s) 104' each can be a single core processor or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using only one computing resource rather than multiple. Multiple virtual machines can also be used with one processor. Other computing resources, such as field-programmable gate arrays (FPGA), application specific integrated circuit (ASIC), digital signal processor (DSP), Graphics Processing Unit (GPU), and general-purpose processor (GPP), may also be used for executing code and/or software. A hardware accelerator 119, such as implemented in an ASIC, FPGA, or the like, can additionally be used to speed up the general processing rate of the computing device 102.

The memory 106 may comprise a computer system memory or random access memory, such as DRAM, SRAM, EDO RAM, etc. The memory 106 may comprise other types of memory as well, or combinations thereof. A user may interact with the computing device 102 through a visual display device 114, such as a computer monitor, which may display one or more user interfaces 115. The visual display device 114 may also display other aspects or elements of exemplary embodiments. The computing device 102 may include other I/O devices such a keyboard or a multi-point touch interface 110 and a pointing device 112, for example a mouse, for receiving input from a user. The keyboard 110 and the pointing device 112 may be connected to the visual display device 114. The computing device 102 may include other suitable conventional I/O peripherals. The computing device 102 may further comprise a storage device 108, such as a hard-drive, CD-ROM, or other storage medium for storing an operating system 116 and other programs, e.g., a program 120 including computer executable instructions solving for, deriving, and/or applying a ranking function, as taught herein.

The computing device 102 may include a network interface 118 to interface to a Local Area Network (LAN), Wide Area Network (WAN) or the Internet through a variety of connections including, but not limited to, standard telephone lines, LAN or WAN links, broadband connections, wireless connections, controller area network (CAN), or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any version of iOS for iPhones®, any version of Android® OS, Windows Phone OS, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Figure 15:
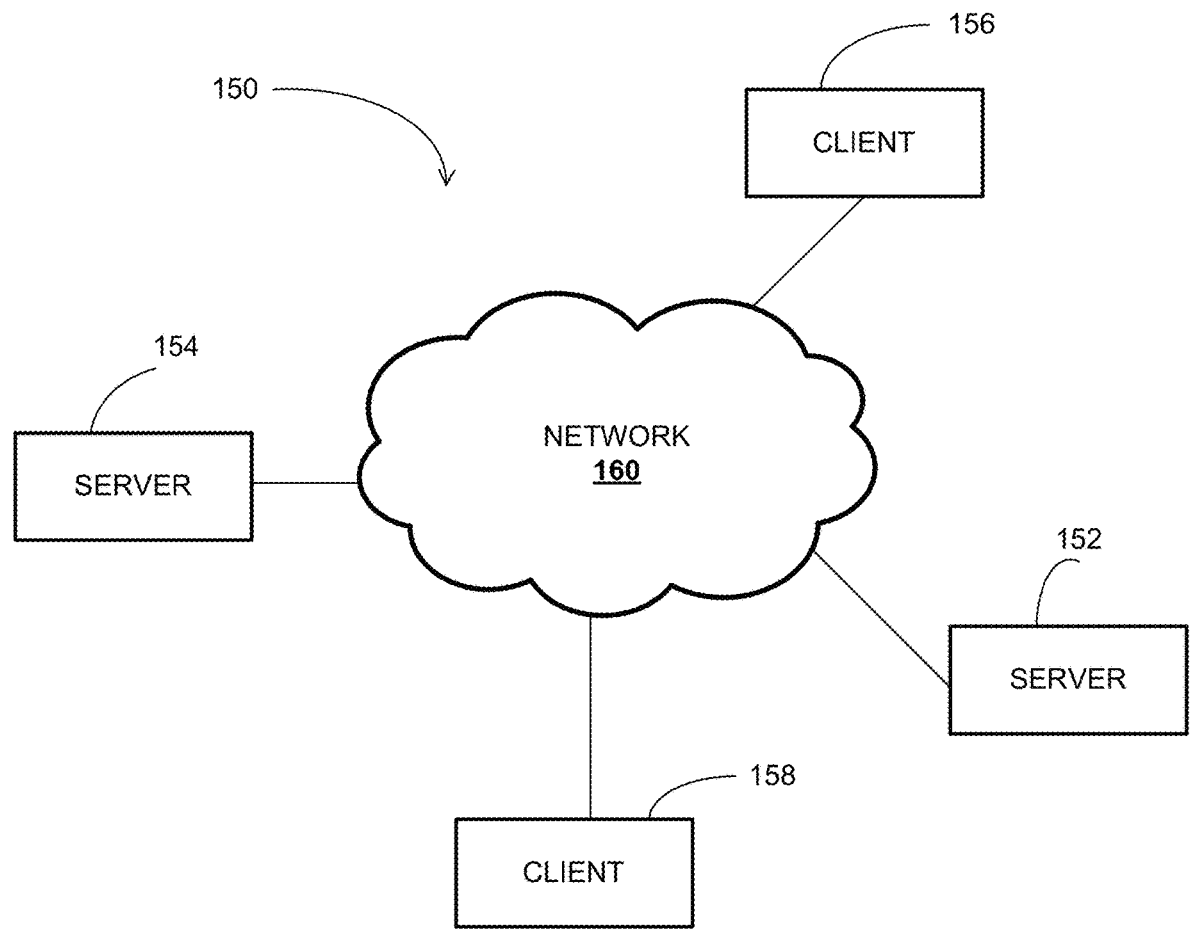
FIG. 15 depicts an exemplary network environment suitable for a distributed implementation of exemplary embodiments of a composable analytics environment.

FIG. 15 illustrates an exemplary network environment 150 suitable for a distributed implementation of exemplary embodiments. The network environment 150 may include one or more servers 152 and 154 coupled to clients 156 and 158 via a communication network 160. In one implementation, the servers 152 and 154 and/or the clients 156 and/or 158 may be implemented via the computing device 102. The network interface 118 of the computing device 102 enables the servers 152 and 154 to communicate with the clients 156 and 158 through the communication network 160. The communication network 160 may include Internet, intranet, LAN (Local Area Network), WAN (Wide Area Network), MAN (Metropolitan Area Network), wireless network (e.g., using IEEE 802.11 or Bluetooth), etc. In addition the network may use middleware, such as COREA (Common Object Request Broker Architecture) or DCOM (Distributed Component Object Model) to allow a computing device on the network 160 to communicate directly with another computing device that is connected to the network 160.

In the network environment 160, the servers 152 and 154 may provide the clients 156 and 158 with software components or products under a particular condition, such as a license agreement. The software components or products may include one or more components of the application 120.

Figure 16:
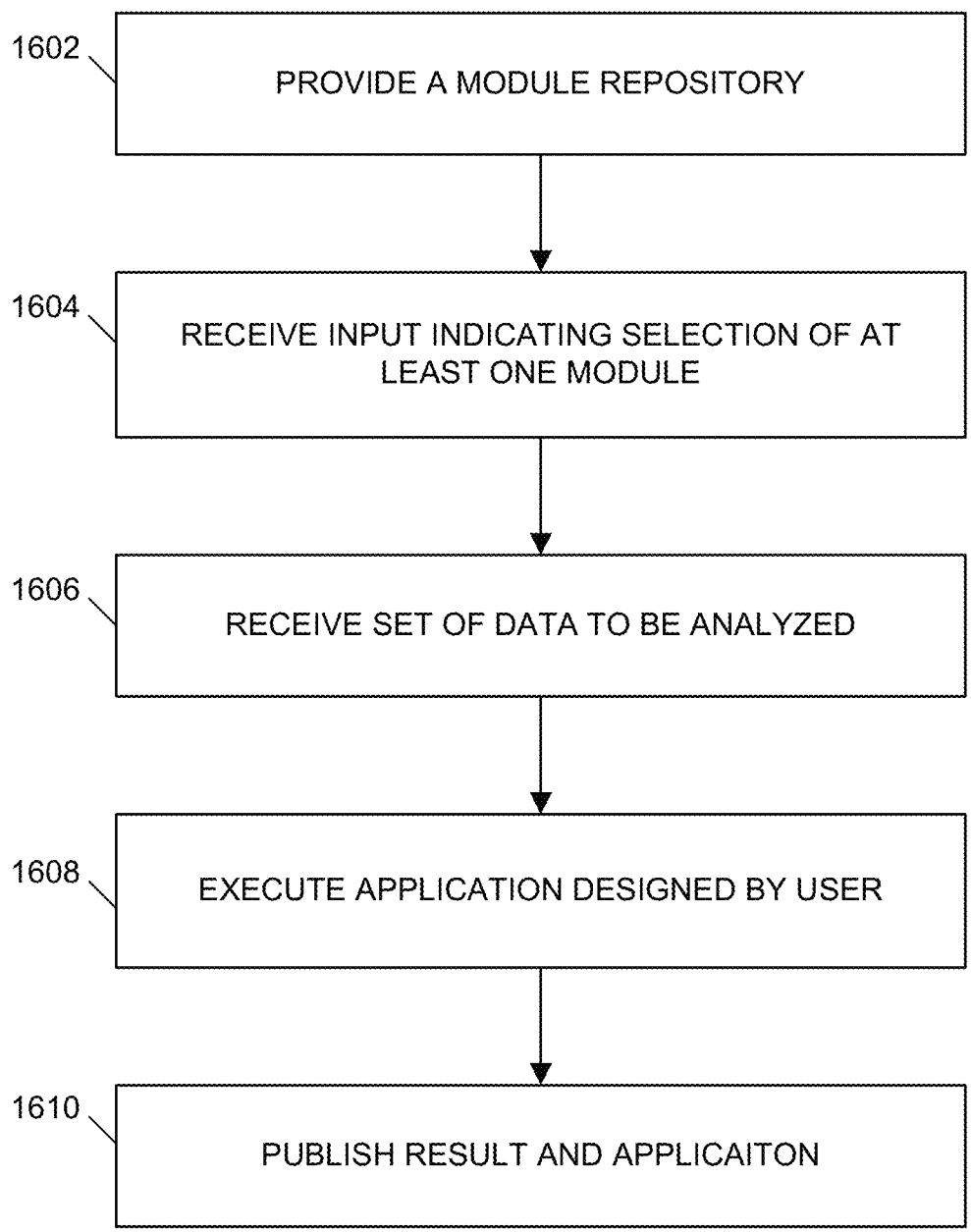
FIG. 16 is a flow chart illustrating an example method for creating an application in a composable analytics environment, according to an example embodiment.

FIG. 16 is a flow chart illustrating an example method 1600 for creating an application using the composable analytics environment, according to an example embodiment. At operation 1602 a graphical module repository is provided. The graphical module repository may contain a plurality of graphical modules as described herein. At operation 1604, an input indicating selection of at least one graphical module is received. At operation 1606, a set of data is received, the data is to be analyzed using the application designed by the user. At operation 1608, the application designed by the user is executed, using the set of data as an input. At operation 1610, the application and the results produced by the application are published on a board as described herein.

Figure 17:
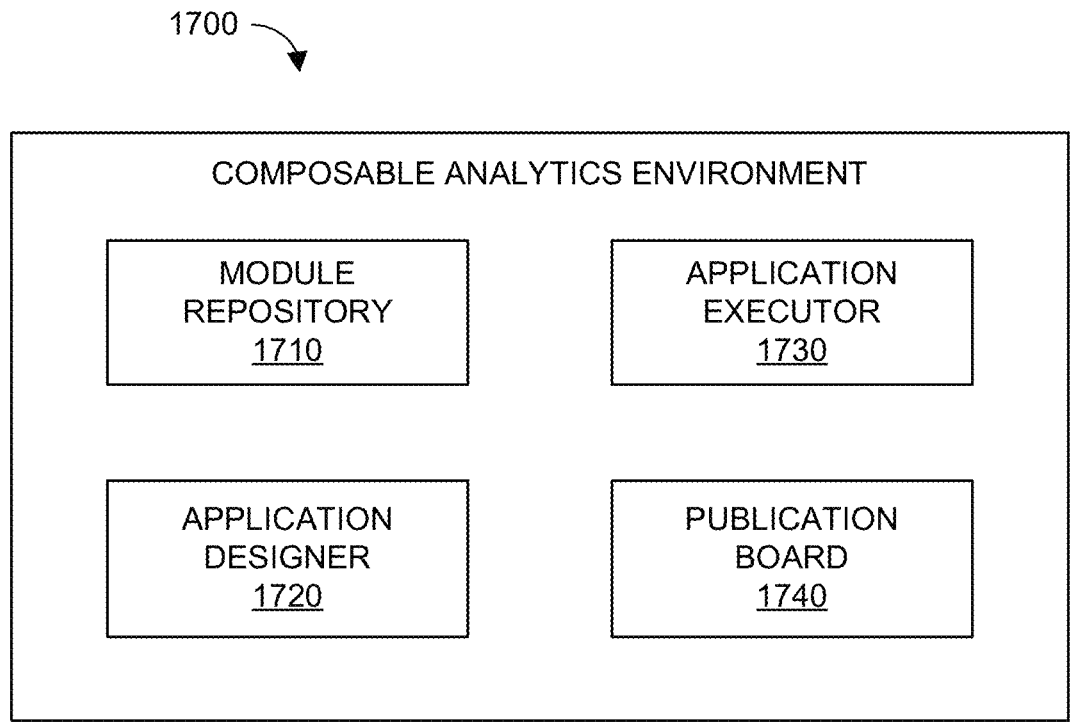
FIG. 17 is a diagram of an example composable analytics environment comprising of components for creating an application in the composable analytics environment, according to an example embodiment.

FIG. 17 is a diagram of an example environment 1700 comprising of components for creating an application in the composable analytics environment, according to an example embodiment. The environment 1700 may include a graphical module repository 1710, an application designer 1720, an application executor 1730, and a publication board 1740. The graphical module repository 1710 may organize and manage a plurality of graphical modules stored in a database. The application designer 1720 may facilitate creating and modification of applications, where the applications include various graphical modules from the graphical module repository. The application executor 1730 may run the application as described herein, and present runtime errors. The publication board 1740 may facilitate organization of applications and results on a board, and may facilitate searching of various boards. A user may search, use, modify, or create applications within the environment 1700.

In this manner, systems and methods for a composable analytics environment are provided. The composable analytics environment combines analytical discovery, development, execution, and collaboration in a single coherent environment. When defining a graphical module, all input data on a graphical module are treated as 'graphical module inputs,' whether these are settings, or business related information. Application creators can parameterize their applications very easily using the same techniques used for receiving information. A graphical module input can also be a collection, and therefore receive multiple connections. By using these techniques, graphical module developers can support complex tree-based input structures by developing other graphical modules and feeding their outputs as inputs into other graphical modules. Graphical module developers no longer have to develop complex user interface controls to receive the data because the application designer of the composable analytics environment already supports these use cases.

Users of the composition environment can view intermediate and final results right after the application has run. They simply click on each of the graphical modules' outputs to view the results. This allows for a seamless user experience between method and data. The application can also be debugged through the web-based designer. The user can halt the execution progress at each graphical module and view the intermediate output. In addition, if the graphical module is a reference to another application, the user can step into the execution of the nested application through the browser. Because applications can be referenced from other applications, they can call themselves. This allows for interesting recursive algorithms.

The composable analytics environment can also supports fine-grained exception analysis. If an exception happens during application execution, the engine knows which graphical module, method, input, and even the connection that may have caused the error. This information is then presented in the designer so the user knows exactly where the error occurred. The composable analytics environment combines data visualizations and methods in a single seamless user experience. Users can navigate between results and the source application easily. The composable analytics environment also provides previews of the application structure when searching for an application.

Although the teachings herein have been described with reference to exemplary embodiments and implementations thereof, the disclosed methods, systems and media are not limited to such exemplary embodiments/implementations. Rather, as will be readily apparent to persons skilled in the art from the description taught herein, the disclosed methods, systems and media are susceptible to modifications, alterations and enhancements without departing from the spirit or scope hereof. Accordingly, all such modifications, alterations and enhancements within the scope hereof are encompassed herein.

What is claimed is:

1. In a composable analytics environment, a method for a user to create an application for data analysis, the method comprising:
   providing a graphical module repository consisting of a plurality of graphical modules, wherein each graphical module of the plurality of graphical modules is configured to perform a data processing function;
   receiving input from a user, via a user interface, indicating selection of at least one graphical module from the graphical module repository to be part of an application, wherein the at least one graphical module selected includes a web request receipt module configured to trigger execution of the application in response to receipt of a web request at a designated Uniform Resource Identifier (URI), and wherein the at least one graphical module includes an input and an output and the input includes a name attribute, a data type attribute and is strongly typed;
   receiving a data set to be analyzed by the application;
   monitoring, with an activation service in the composable analytics environment, to identify a web request received at the URI;
   autonomously triggering, following an identification of the receipt of the web request by the activation service, an execution of the application;
   executing the application to perform data analysis on the data set using the at least one graphical module; and
   publishing a result of the data analysis and the application on a board in the composable analytics environment accessible by other users having access to the composable analytics environment.

2. The method of claim 1, wherein the application is published and accessible by other users for reuse.

3. The method of claim 1, wherein the graphical module repository is searchable by the user.

4. The method of claim 1, wherein the composable analytics environment is searchable for other applications by the user.

5. The method of claim 4, wherein the composable analytics environment is searchable for other applications based on access permissions associated with the other applications.

6. The method of claim 1, further comprising rendering the user interface and receiving input from the user via the user interface.

7. The method of claim 1, further comprising adding an additional graphical module to the graphical module repository, the additional graphical module created by the user.

8. The method of claim 1, further comprising:
   receiving input from the user, via the user interface, indicating a selection of an additional graphical module from the graphical module repository to be part of the application; and
   receiving input from the user, via the user interface, graphically connecting an output of the at least one graphical module to an input of the additional graphical module.

9. The method of claim 1, further comprising executing a web browser to access the composable analytics environment.

10. The method of claim 1, wherein the external factor is an occurrence of a specified time, a receipt of an email, or a receipt of a web request.

11. The method of claim 1, wherein the published result includes a result from a graphical module in the application other than a final output module.

12. The method of claim 1, further comprising determining which application needs to run based on a specified application ID in the web request.

13. In a composable analytics environment, a system for a user to create an application for data analysis, the system comprising:
   a graphical module repository stored on a database, the graphical module repository consisting of a plurality of graphical modules, each graphical module of the plurality of graphical modules configured to perform a data processing function;
   a processor configured to execute:
      an application designer configured to:
         receive input from a user indicating selection of at least one graphical module from the graphical module repository to be part of an application, wherein the at least one graphical module selected includes a web request receipt module configured to trigger execution of the application in response to receipt of a web request at a designated Uniform Resource Identifier (URI),wherein the at least one graphical module includes an input and an output and the input includes a name attribute, a data type attribute and is strongly typed, and receive a data set to be analyzed by the application;

an activation service configured to monitor and identify a web request received at the URI, and autonomously trigger, following an identification of the receipt of the web request, an execution of the application;

an application executor configured to execute the application to perform data analysis on the data set using the at least one graphical module; and a publication module configured to publish a result of the data analysis and the application on a board in the composable analytics environment accessible to other users having access to the composable analytics environment.

14. The system of claim 13, wherein the application is published and accessible by other users for reuse.

15. The system of claim 13, wherein the application designer is configured to render a user interface and receive input from the user via the user interface.

16. The system of claim 13, wherein the graphical module repository is searchable by the user.

17. The system of claim 13, wherein the composable analytics environment is searchable for other applications by the user.

18. The system of claim 17, wherein the composable analytics environment is searchable for other applications based on access permissions associated with the other applications.

19. The system of claim 13, wherein the application designer is further configured to:
receive input from the user, via a user interface, indicating a selection of an additional graphical module from the graphical module repository to be part of the application; and
receive input from the user, via the user interface, graphically connecting an output of the at least one graphical module to an input of the additional graphical module.

20. The system of claim 13, wherein the published result includes a result from a graphical module in the application other than a final output module.

21. A non-transitory computer readable medium storing instructions executable by a processing device, wherein execution of the instructions causes the processing device to implement a method in a composable analytics environment for a user to create an application for data analysis comprising:
providing a graphical module repository consisting of a plurality of graphical modules, wherein each graphical module of the plurality of graphical modules is configured to perform a data processing function;
receiving input from a user, via a user interface, indicating selection of at least one graphical module from the graphical module repository to be part of an application, wherein the at least one graphical module selected includes a web request receipt module configured to trigger execution of the application in response to receipt of a web request at a designated Uniform Resource Identifier (URI), and wherein the at least one graphical module includes an input and an output and the input includes a name attribute, a data type attribute and is strongly typed;
receiving a data set to be analyzed by the application;
monitoring, with an activation service in the composable analytics environment, to identify a web request received at the URI;
autonomously triggering, following an identification of the receipt of the web request by the activation service, an execution of the application;
executing the application to perform data analysis on the data set using the at least one graphical module; and
publishing a result of the data analysis and the application on a board in the composable analytics environment accessible by other users having access to the composable analytics environment.

22. The non-transitory computer readable medium of claim 21, further comprising:
receiving input from the user, via the user interface, indicating a selection of an additional graphical module from the graphical module repository to be part of the application; and
receiving input from the user, via the user interface, graphically connecting an output of the at least one graphical module to an input of the additional graphical module.

23. The non-transitory computer readable medium of claim 21, wherein the published result includes a result from a graphical module in the application other than a final output module.

* * * * *